United States Patent
Idleman et al.

[11] Patent Number: 6,154,850
[45] Date of Patent: *Nov. 28, 2000

[54] DATA STORAGE SYSTEM AND METHOD

[75] Inventors: Thomas E. Idleman, Santa Clara; Robert S. Koontz, Atherton, both of Calif.

[73] Assignee: Beaufort River, Inc., Hilton Head Island, S.C.

[ * ] Notice: This patent is subject to a terminal disclaimer.

[21] Appl. No.: 08/143,759

[22] Filed: Nov. 1, 1993

[51] Int. Cl.⁷ ..................................................... H02H 3/05
[52] U.S. Cl. ..................................................... 714/5; 714/6
[58] Field of Search ................................ 395/575, 182.03, 395/182.04, 182.05, 182.06, 182.07, 182.08, 182.09, 182.11, 183.18; 371/21.1, 37.7, 40.11, 40.2, 40.4, 40.15, 40.16; 714/7–11, 13, 42, 5, 6, 718, 758, 763, 764

[56] References Cited

U.S. PATENT DOCUMENTS

| | | | |
|---|---|---|---|
| 4,453,215 | 6/1984 | Reid | 714/11 |
| 4,486,826 | 12/1984 | Wolff et al. | 714/9 |
| 4,597,084 | 6/1986 | Dynneson et al. | 714/805 |
| 4,649,475 | 3/1987 | Scheuneman | 711/149 |
| 4,654,857 | 3/1987 | Samson et al. | 714/5 |
| 4,868,734 | 9/1989 | Idleman et al. | 364/200 |
| 5,023,891 | 6/1991 | Johnson, III | 375/87 |
| 5,134,619 | 7/1992 | Henson et al. | 371/40.1 |
| 5,140,592 | 8/1992 | Idleman et al. | 371/8.1 |
| 5,146,574 | 9/1992 | Gajjar et al. | 395/425 |
| 5,166,939 | 11/1992 | Jaffe et al. | 371/40.1 |
| 5,173,900 | 12/1992 | Miller et al. | 370/110.1 |
| 5,175,537 | 12/1992 | Jaffe et al. | 340/825.5 |
| 5,212,785 | 5/1993 | Powers | 395/575 |
| 5,257,391 | 10/1993 | DuLac | 395/800 |
| 5,274,645 | 12/1993 | Idleman | 371/10.1 |
| 5,285,456 | 2/1994 | Cheney | 371/49.1 |
| 5,325,363 | 6/1994 | Lui | 371/8.1 |
| 5,373,512 | 12/1994 | Brady | 371/40.1 |
| 5,418,752 | 5/1995 | Harari et al. | 365/218 |
| 5,502,811 | 3/1996 | Ripberger | 395/182.04 |
| 5,671,229 | 9/1997 | Harari et al. | 371/10.2 |

*Primary Examiner*—Dieu-Minh T. Le
*Attorney, Agent, or Firm*—Ralph Bailey, P.A.

[57] ABSTRACT

A method and apparatus for controlling data flow between a computer (10) producing a high speed data stream coupled to a buffered storage device including a disc array (43) and to a group of slower speed storage devices including tape drives arranged in a predetermined logical configuration including arrays (42). The system includes controllers (41) that work together such that if one of the controllers fails, the routing between the controllers and the tape drives is switched to the properly functioning controller without the need to involve the computer or operator in the rerouting process thus providing a redundancy of access control and sequencing. The apparatus also includes components which permit a functioning controller to assume control of tape arrays formerly primarily controlled by the failed controller. In addition, the apparatus provides error check and correction generation devices (45, 58) as well as tape storage device configuration circuitry.

6 Claims, 19 Drawing Sheets

Figure 5a

ARRAY CODEWORD: $d_{n-1}(i,j)$ | $d_{n-2}(i,j)$ | ... | $d_1(i,j)$ | $d_0(i,j)$ | $p(i,j)$

Figure 5b

| | 1st ARRAY CODEWORD for BLOCK j | 2nd ARRAY CODEWORD for BLOCK j | ... | | Last ARRAY CODEWORD for BLOCK j |
|---|---|---|---|---|---|
| TAPE p | $p(0,j)$ | $p(1,j)$ | ... | $p(k-2,j)$ | $p(k-1,j)$ |
| TAPE 0 | $d_0(0,j)$ | $d_0(1,j)$ | ... | $d_0(k-2,j)$ | $d_0(k-1,j)$ |
| TAPE 1 | $d_1(0,j)$ | $d_1(1,j)$ | ... | $d_1(k-2,j)$ | $d_1(k-1,j)$ |
| ... | ... | ... | ... | ... | ... |
| TAPE n-2 | $d_{n-2}(0,j)$ | $d_{n-2}(1,j)$ | ... | $d_{n-2}(k-2,j)$ | $d_{n-2}(k-1,j)$ |
| TAPE n-1 | $d_{n-1}(0,j)$ | $d_{n-1}(1,j)$ | ... | $d_{n-1}(k-2,j)$ | $d_{n-1}(k-1,j)$ |

Figure 5 (a and b)

Figure 6 (a and b)

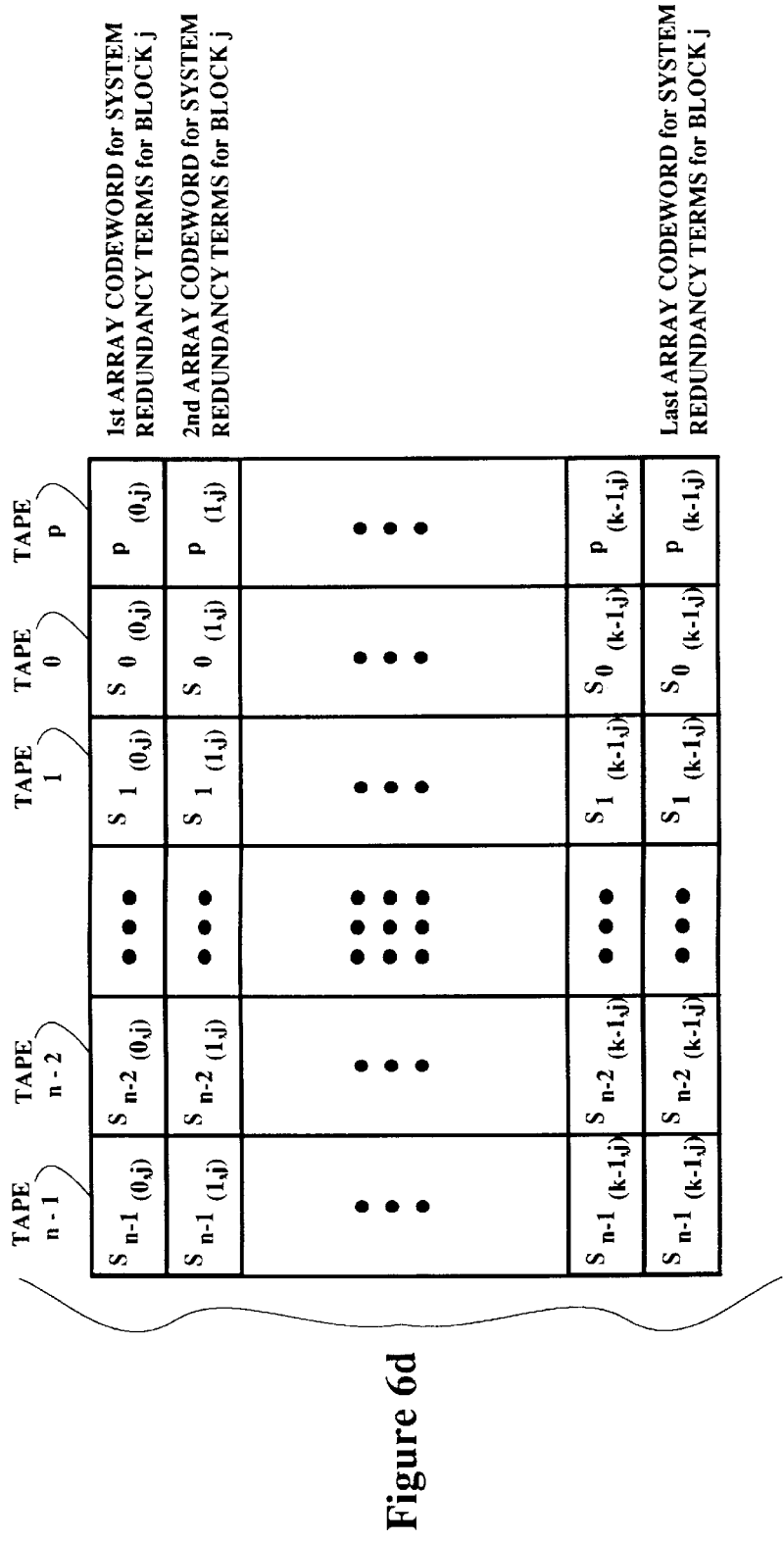
Figure 6 (c and d)

| TA 1 | TA 2 | TA 12 | TA 13 | TA 14 | TA 15 | TA 16 |
|---|---|---|---|---|---|---|
| 0, 1, 2, p | 3, 4, 5, p | 0, 4, 8, p | 1, 5, 9, p | 2, 6, 10, p | 3, 7, 11, p | S0, S1, S2, p |
| 6, 7, 8, p | 9, 10, 11, p | 12, 16, 20, p | 13, 17, 21, p | 14, 18, 22, p | 15, 19, 23, p | S3, S4, S5, p |
| 12, 13, 14, p | 15, 16, 17, p | 24, 28, 32, p | 25, 29, 33, p | 26, 30, 34, p | 27, 31, 35, p | S6, S7, S8, p |
| 18, 19, 20, p | 21, 22, 23, p | 36, 40, 44, p | 37, 41, 45, p | 38, 42, 46, p | 39, 43, 47, p | S9, S10, S11, p |
| 24, 25, 26, p | 27, 28, 29, p | 48, 52, 56, p | 49, 53, 57, p | 50, 54, 58, p | 51, 55, 59, p | S12, S13, S14, p |
| 30, 31, 32, p | 33, 34, 35, p | 60, 64, 68, p | 61, 65, 69, p | 62, 66, 70, p | 63, 67, 71, p | S15, S16, S17, p |
| 36, 37, 38, p | 39, 40, 41, p | 72, 76, 80, p | 73, 77, 81, p | 74, 78, 82, p | 75, 79, 83, p | S18, S19, S20, p |

Figure 10

DATA STORAGE SYSTEM AND METHOD

BACKGROUND OF THE INVENTION

The present invention relates to the improvement in performance and reliability of serial information as stored or retrieved using tape and/or re-writable optical drives. More particularly, the invention is a method and apparatus for interfacing an external computer to a set of such storage devices.

Magnetic tape and/or re-writable optical drive memories for use with digital computer systems are known. Although many types of tape and/or re-writable optical drives are known, the present invention will be described using tape drives. However, nothing herein should be taken to limit the invention to that particular embodiment.

Many computer systems use a plurality of tape drive memories to store data. A common known architecture for such systems is shown in FIG. 1. Therein, computer 10 is coupled by means of channel buses 15 to a tape controller 22 to a plurality of tape drives 26.

Each tape drive in the system is accessed and the data thereon transferred individually. The tape controller 22 associated with each tape drive 26 controls the input/output operations for the particular tape drive to which it is coupled. Data stored on a tape is available for transmission to computer 10 over channel buses 15. When the computer transmits data to be written on the tapes, the controller 22 receives the data for the individual tape drives from one of the channel buses 15. In this type of system, tape operations are synchronous in relationship to each other.

In the case where one of the controllers experiences a failure, the computer and computer operator must take action to isolate the failed controller and to switch the tape formerly under the failed computer's control to a properly functioning other tape controller. The switching requires the computer and the operator to perform a number of operations. First they must isolate the failed computer. This means that all data flow directed to the failed controller must be stopped and then after the tape is mounted the data flow is redirected to a working controller and tape drive.

In the system described above, it is necessary for the computer and the operator to be involved with rerouting data away from a failed controller or tape drive. The necessary operations performed by the computer and operator in completing the rerouting requires the computer and operator's attention. This places additional functions on the computer and operator which may delay other functions while the computer and operator are working on the rerouting. As a result, the entire computer system is slowed down.

Another problem associated with tape operations, in particular writing and reading, is an associated probability of error. Procedures and apparatus have been developed which can detect and, in some cases, correct the errors which occur during the reading and writing of the tapes. With relation to a generic tape drive, the tape is divided into a plurality of data blocks, each block having the same, predetermined size. Each block has a particular format which includes an ECC ("Error Correction Code") which allows for the detection and correction of errors within the data block.

When a tape is written to, the controller generates the ECC and appends it to the data; then the new data and the new ECC data are written onto the tape.

Read operations are similar in that initially both the data and the ECC are read. If no errors are detected the data is transmitted to the computer. If errors are detected, the error correction function located within the tape controller tries to correct the error. If this is possible, the correction data is transmitted. Otherwise, the tape controller signals to the computer that an uncorrectable error has been detected.

In the system shown in FIG. 2, computer 10 is coupled by means of channel buses 15 to the tape controller 32 which is coupled to bus 34. The bus 34, a Small Computer Standard Interface ("SCSI"), is individually coupled to a plurality of tape drives 38, through connections 36. The American National Standard for Information Processing ("ANSI") has promulgated a standard for SCSI which is described in ANSI document number X3.130-1986.

In this system, as blocks of data are read from the individual tape drives, the data is verified with the ECC, and then the data is individually and sequentially placed on the bus 34 and is then transmitted to the computer 10 over channel buses 15 through controller 32. If additional processing by the controller 32 is required, then the data and the ECC is transmitted over bus 34 sequentially. The bus 34 width can be 8-bits, 16-bits, or 32-bits wide.

Those tape systems which utilize known error corrections techniques have several short comings. In the systems illustrated in FIGS. 1 and 2, data transmission is sequential over a single bus with a relatively slow rate of data transfer. Additionally, as the error correction circuitry must wait until a block of data of predefined size is assembled before it can detect and correct errors therein, there is an unavoidable delay while such detection and correction takes place.

As stated, the most common form of data transmission in these systems is serial data transmission. Given that tape drives have a fixed bandwidth, it takes a fixed and relatively large amount of time for transmission of the data between the tapes and the computer. If a single tape fails, all of the data on that tape may not be usable. Therefore, a system which has a plurality of tape drives which can increase the rate of data transfer between the computer and the tape drives and more effectively match the data transfer rate to the computer's maximum efficient operating speed is desirable. The system should also be able to conduct this high rate of data transfer while performing all necessary error detection and correction functions and at the same time provide an acceptable level of performance even when an individual tape of tape drive fails.

Another failing of prior art systems is that they do not exploit the full range of data organizations that are possible in a system using groups of tape drives. A tape storage apparatus made up of a plurality of tapes may be called upon to operate as a logical tape device for running applications having high data transfer rates. For example, an application requiring very large data transfers requires higher bandwidth. Known operating techniques for physical tape sets do not provide the capability of configuring a single set of reliable tape drives to provide extremely high data transfer rates.

It would therefore be desirable to be able to provide a tape storage apparatus, made up of a plurality of physical tape drives, which could provide the necessary high bandwidth, along with high reliability.

SUMMARY OF THE INVENTION

The present invention provides a set of tape drives that appears to an external computer as one or more logical disk drives. The tape drives are arranged in sets. Data is broken up and written across the tape drives in a set, with error detection and correction redundancy data being generated in the process and also being written to a redundancy area.

Multiple control systems for the sets are used, with any one set having a primary control system and another control system which acts as a backup. The error correction or redundancy data is generated as data is transferred from the computer and is written on the disk drives before being transferred to the tape drive sets. When data is read to the computer from the tape drive sets, it is staged on the disk drives and the redundancy data is verified to confirm the integrity of the data. Lost data from a particular tape drive (or tape) can be regenerated using the remaining data before being transferred to the computer.

The invention provides an arrangement of controllers, mirrored disk drives, data tape drives, and error correction code tape drives, the tape drive sets being coupled to the mirrored disk drives and an ECC function for error detection and correction. An aspect of the invention is error detection and correction which occurs with the transfer of data to and from the disk drives. The disk drives can then be read from or written to in sequence for transfer on a data bus to the system computer. The ECC function is connected to the disk drive data paths.

A number a tape drives may contain tapes which are operatively interrelated so as to form one or more redundancy groups. A logical redundancy group is a set of tapes which share redundancy data. The locations of the redundant information within a redundancy group, are configurable to meet desired capacity, transfer rates and reliability requirements. A second logical level, blocks of tape data are grouped into one or more logical data groups. A logical redundancy group may be divided into more than one such data group. The addressing sequence and arrangement of the data blocks in each logical data group are configurable to divide the tape storage apparatus into multiple logical data areas each having different bandwidth rate characteristics.

Another level of addressing for interacting with the software of a host computer operating system is also provided. This software superimposes logical unit addresses on the tape data groups, in combinations, to form one or more redundancy groups and to appear to the software as a single tape data storage unit.

As data is written to the system by the host computer, the ECC calculates the redundancy terms and the controller stores them on designated sectors on the disk drives. As data is transmitted to and from the disk drives, it passes through the controller and ECC function. The time it takes to perform the ECC checking is small in relationship to the transfer of a sector of data. There is sufficient time to allow the ECC function to calculate the redundant terms without interrupting or affecting the transfer of this data to the disk drives. During a write operation, this arrangement allows the redundant values to be generated while being transmitted from the host computer and written to their designated drive sectors. The redundant data is written to the disk drive sectors in a continuous operation after the data transmitted by the host computer has been written. In effect this establishes a data pipeline to write data to the disk drives.

After the data is staged onto the disk drives, it is then routed to a tape array for a write operation or to the host computer for a read operation.

In one preferred embodiment, two disk drives are provided. Both disk drives can be used simultaneously on two operation that access different blocks of data, or one can be used if the other fails.

Under control of a system controller, a malfunctioning disk drive can be decoupled from the system by reconfiguring, and the data that was to be stored on the failed disk can be rerouted to the other disk drive. Similarly, a tape array that malfunctions can be decoupled from the system by reconfiguring, and the data that was to be stored on the failed set of tapes can be rerouted to another set of tapes. As the host computer is not involved in the detection or correction of data errors, or in reconfiguring the system in the case of a failed drive or a set of tapes, these processes are said to be transparent to the host computer.

In an embodiment of the present invention, a plurality of disk drives and a plurality of sets of tapes, each set of tapes having at least one data path to each disk drive. In operation, a failure of any set of tapes or disk drive may be compensated for by rerouting the data flow through any operational drive or set of tapes. In this embodiment, full availability to the data can be maintained when a disk drive or a set of tapes fail.

This invention provides advantages over the prior art by maximizing the use of paths to the set of tapes while increasing the data availability. Redundancy and a level of fault tolerance is also provided by the described arrangement of the sets of tapes and the disk drives.

Another aspect of the present invention is that it can switch control of disk drives and the sets of tapes when a particular controller fails. The switching is performed in a manner transparent to the computer.

The two controllers are each connected to the computer. Connected to the other side of the controllers are the disk drives and the sets of tapes. Each controller can route data to any one of the disk drives and/or any one of the sets of tape arrays. Communication buses tie together the controllers for communications between themselves. In this embodiment, the system is configured such that the controllers are grouped in pairs. The configuration provides each controller with an associated backup controller. This configuration provides for efficient rerouting procedures for the flow of data to the disk drives and/or the sets of tapes. For ease of understanding, the specification will describe the system configured with pairs of controllers. Of course, it should be understood that the controllers could be configured in groups of three or more.

A switching function is implemented to connect each of the controllers to a pair of disk drives and the sets of tape arrays. In case that a controller should fail, the computer need not get involved with the rerouting of data to the disk drives and to the sets of tapes. Instead, the properly working controller will handle the failure without the involvement of the computer. This allows the logical configuration of the disk drives and the sets of tapes to remain constant from the perspective of the computer despite a change in the physical configuration.

There are two levels of severity a failures that can arise. The first type of failure is a controlled failure where the failed controller can continue to communicate with the rest of the system. The partner controller is informed of the malfunction. The properly functioning second controller then informs the first controller to switch the data paths to the functioning controller. Next, the malfunctioning controller releases its control of the disk drives and the sets of tapes. and the functioning controller assumes control. Finally, the properly functioning controller checks, and if necessary, corrects data written to the drives and the sets of tapes by the malfunctioning controller.

The second type is a complete controller failure. In the case of a complete failure, the failed first controller stops communicating with the second controller. The properly working second controller may recognize this failure when trying to route data to the failed first controller. In either case, the second controller will switch the data paths from the failed first controller to the properly functioning second controller. Once the rerouted paths have been established, the properly functioning second controller assumes control of the data paths, the disk drives, and the sets of tapes.

For a more complete understanding of the nature and the advantages of the invention, reference should be made to the ensuing detailed description taken in conjunction with the accompanying drawings.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGS. 5a and 5b show how the array codewords are formed and stored in one embodiment of the present invention;

FIGS. 6a–6d show how the system codewords are formed in one embodiment of the present invention;

FIG. 10 is a schematic diagram of the distribution of data in an embodiment of a redundancy group according to the present invention.

DESCRIPTION OF A PREFERRED EMBODIMENT

The embodiments of the present invention comprise a system of data storage. In the embodiment described herein, the preferred devices for storing data are hard disk drives and magnetic tape drives, referenced herein as disk drives and tape drives. Nothing herein should be understood to limit this invention to using disk drives and tape drives only. Any other device for storing data may be used, including, but not limited to, flash memory storage, floppy disks, and optical disks.

Overall System Environment

Figure 1:
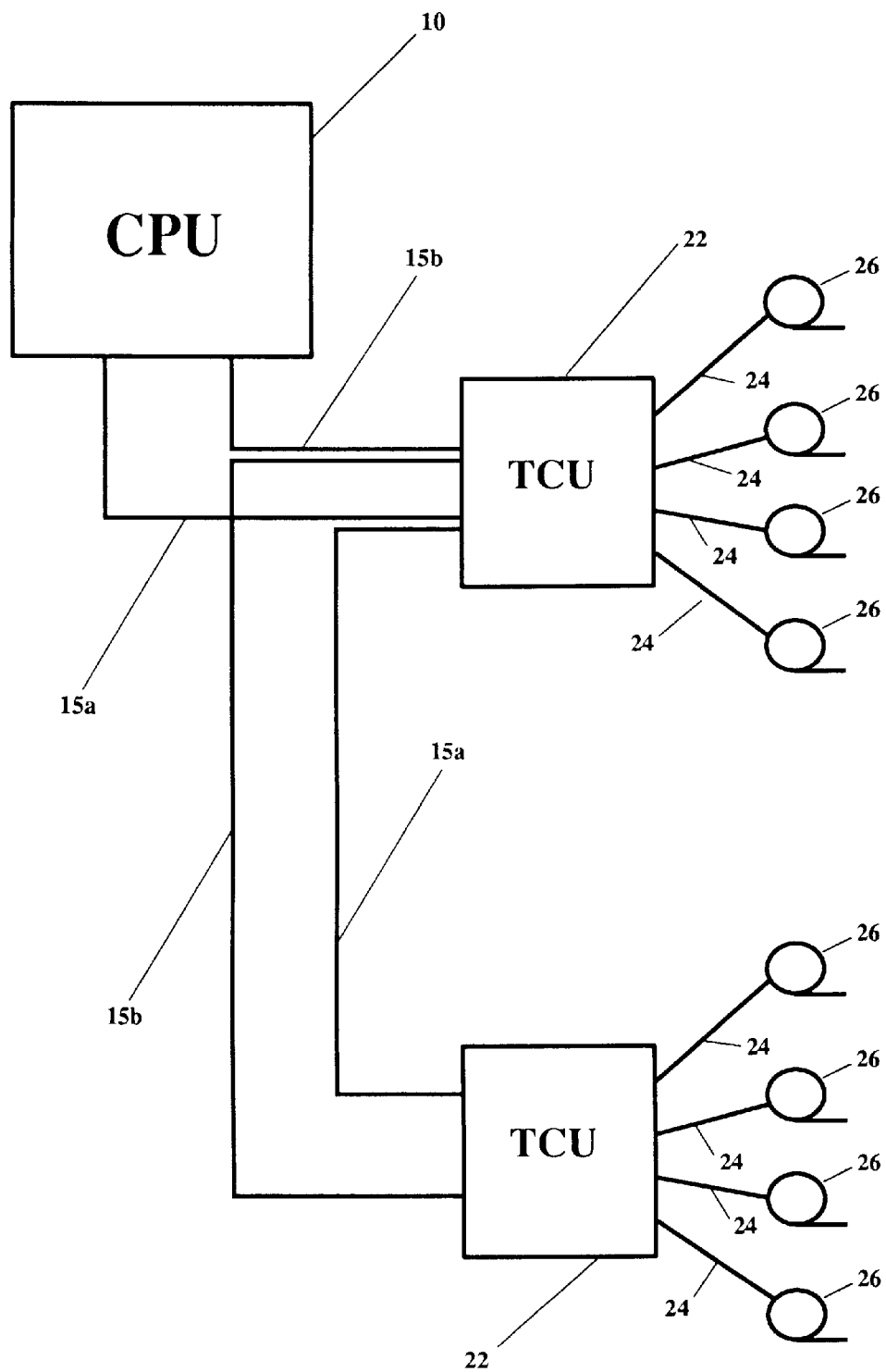
FIG. 1 is a block diagram illustrating a prior art tape array system.
Figure 2:
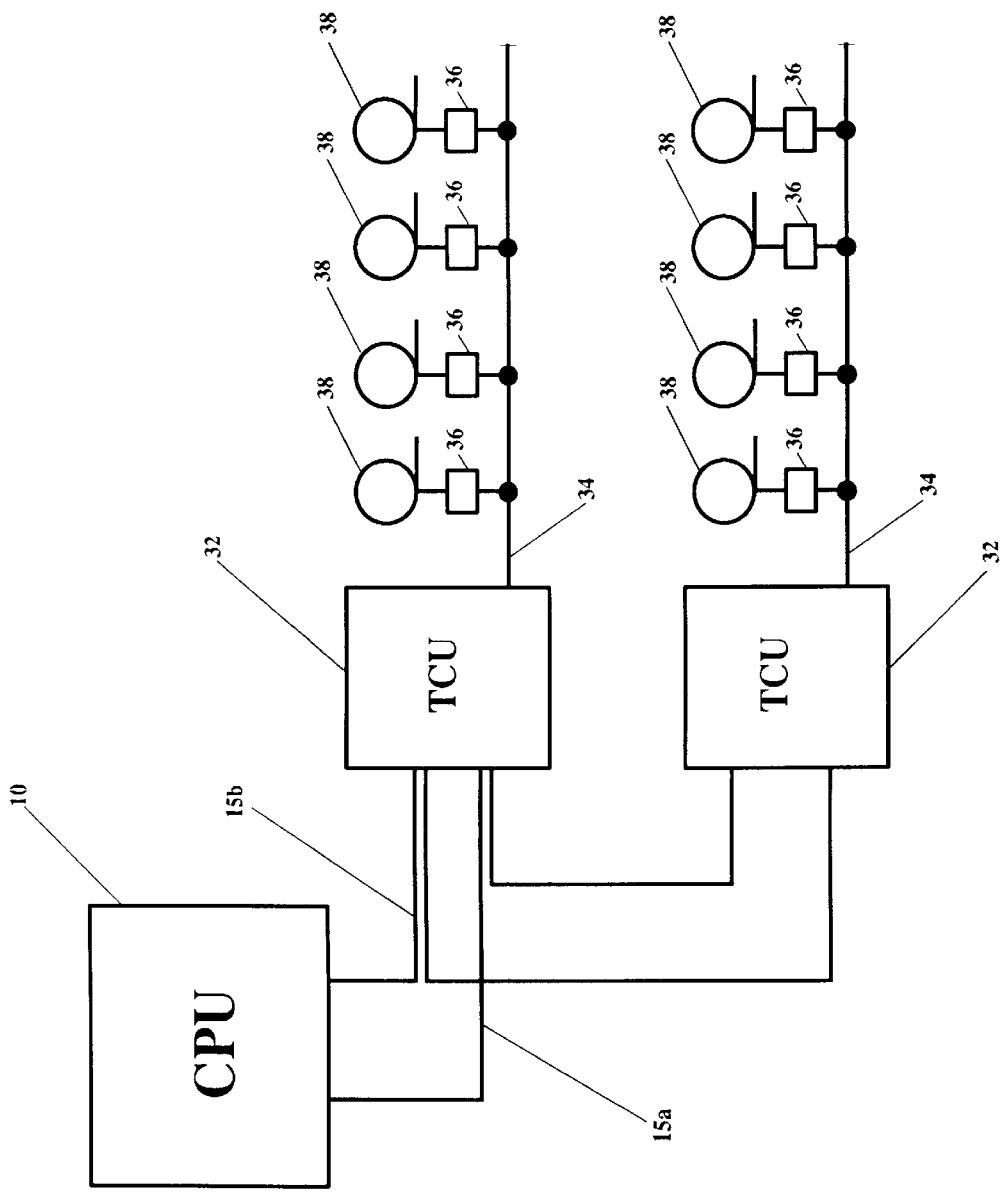
FIG. 2 is a block diagram illustrating a prior art tape array system with an error check and correction block.
Figure 3:
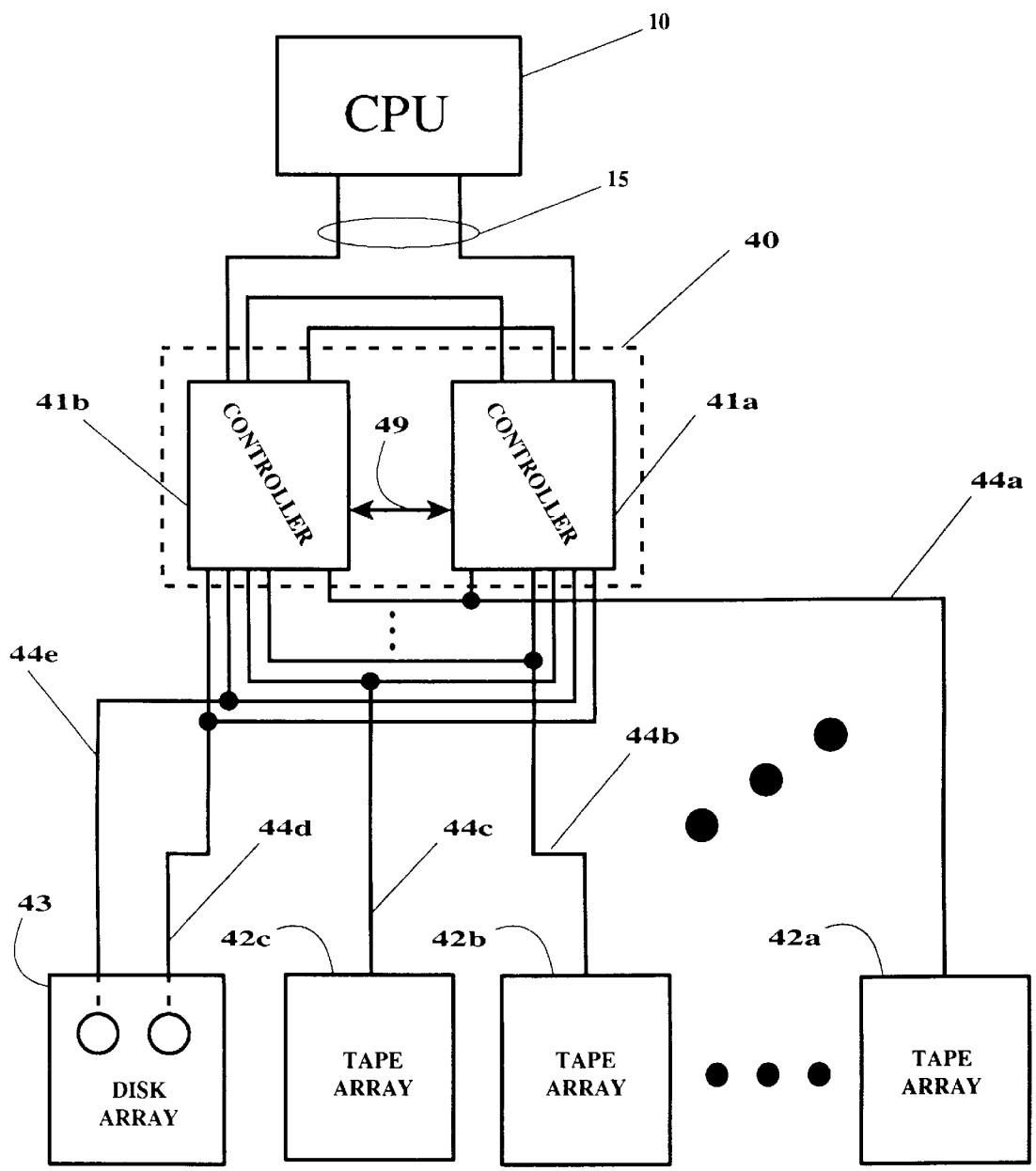
FIG. 3 is a diagram illustrating a preferred embodiment of the overall system of the present invention.

One embodiment of the present invention operates in the environment shown in FIG. 3. In FIG. 3, computer 10 communicates with disk array 43 and a group of tape arrays 42 through control function 40. In a preferred embodiment, control function 40 includes components which permit computer 10 to access disk array 43 or tape arrays 42 even when there is a failure in one of the components of the control function 40. As shown in FIG. 3, the control function 40 includes a pair of controllers 41. The two controllers 41a and 41b combine with the multiple interfaces 44 to provide computer 10 access the disk drive array 43 and the sets of tape arrays 42 through more than one path. In this way, if either of the two controllers 41 experience a failure in one of their components, a path may be routed without computer 10 being interrupted. One of the two controllers 41 is configured to be primarily responsible for the disk array and the sets of tape arrays. The other controller has a secondarily responsibility for the disk array and sets of tape arrays.

The arrays are connected to the controllers 41 through a set of control and data interfaces 44. These interfaces are used by the controllers 41 to configure the arrays in a particular arrangement. For example, disk drives 53a and 53b are configured to store mirrored data and ECC for the system while tape arrays 42a and 42b may be set to store data for the system, and tape array 42c set to store the redundant information (or error correction codes). Of course, the sets of tape arrays 42 within the system can be rearranged and may assume a wide variety of configurations.

Figure 4:
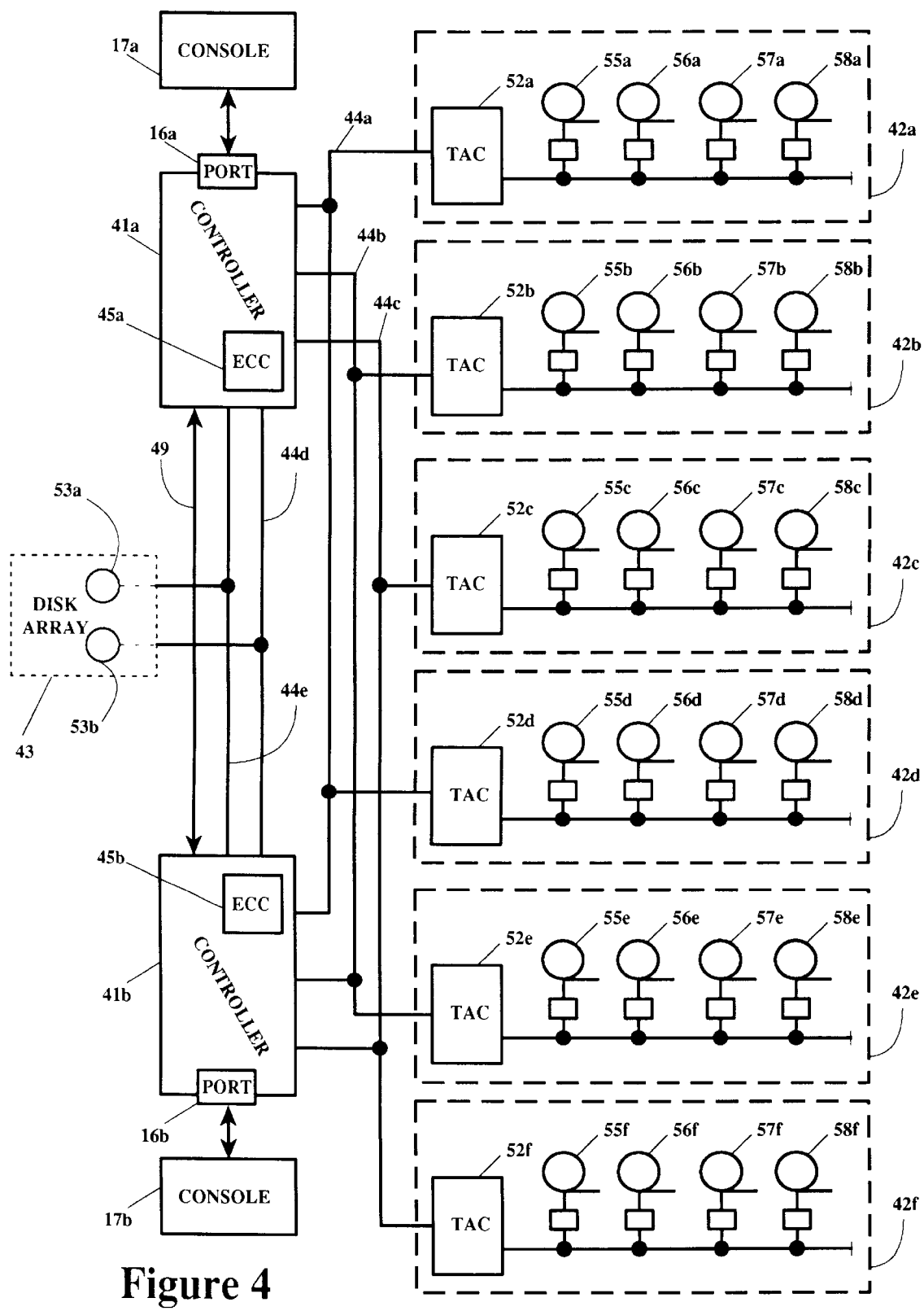
FIG. 4 is a diagram showing a more detailed illustration of FIG. 3 including the interconnections of the disk drives and the sets of tapes.

FIG. 4 is a more detailed diagram showing the interconnection of the components of the input/output system associated with computer 10 for accessing the disk drive array 43 and the sets of tapes (tape arrays) 42. Computer 10 has its input/output ports 15 connected to the controllers 41a and 41b. The line 49 between the controllers 41 represents buses through which control and status signals flow to allow for communication between the controllers.

The tape arrays 42 are arranged in a manner so that one controller 41 is primarily responsible for a group of tape arrays. As shown in FIG. 4, controller 41a may be primarily responsible for the tape arrays 42a–42c. The second controller 41b may be primarily responsible for the remaining tape arrays 42d–42f. The controllers 41 are secondarily responsible for the tape arrays primarily controlled by the partner computer. In the particular arrangement shown in FIG. 4, controller 41a may be primarily responsible for the three arrays 42a, 42b, and 42c, and secondarily responsible for the three tape arrays 42d, 42e, and 42f. The second controller 41b is primarily responsible for the three tape arrays 41d, 41e, and 41f, and secondarily responsible for the three tape arrays 42a, 42b, and 42c.

Each controller 41 contains a recovery system as a portion of the controller's software code which manages the communication between controllers 41 and the disk array 43 and the tape arrays 42. This software is typically implemented as a state machine which is in the form of microcode for moving a controller 41 from one state to another (described below). The state changes are precipitated by different events or by messages sent between the components of the system.

An ECC block 45 is included within each controller 41. ECC block 45 contains functions for checking and correcting errors in the data which occur as the data is passed between the components of the system. These functions are described in more detail below. Secondary control can be altered.

Figure 7:
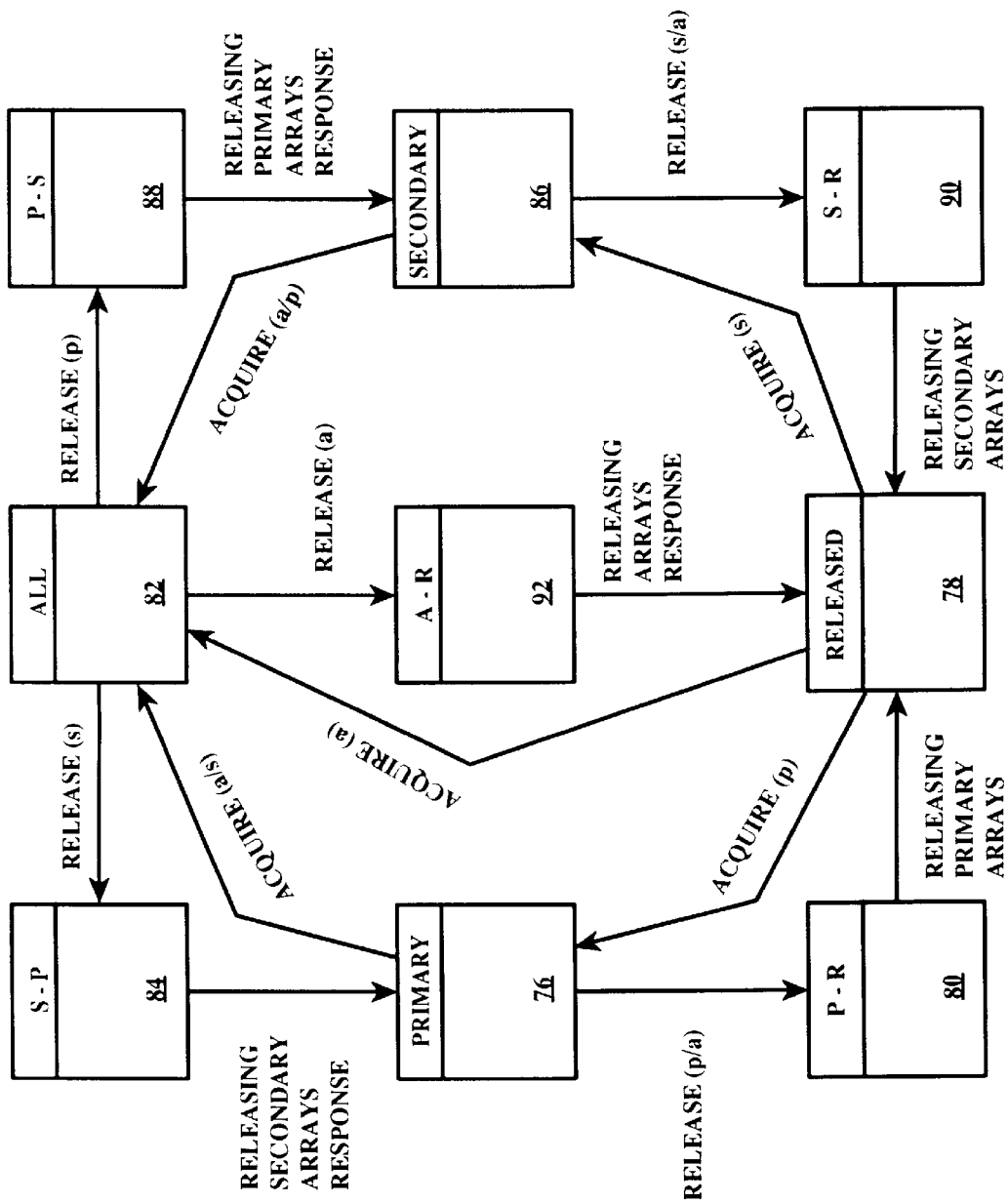
FIG. 7 is a recovery state transition diagram illustrating the various possible states of a particular controller.

FIG. 7 is a state transition chart showing the relationships between the various states of software which manages the communication between controllers 41 and the disk array and the tape arrays. Each controller 41 must be in only one state at any particular time. Initially, assuming that the system is performing properly and each controller 41 is primarily responsible for half of the tape arrays 42 and secondarily responsible for the other half of the tape arrays 42, the controller 41 is in the PRIMARY SATE 76. While in the PRIMARY STATE 76, two major events may happen to move a controller 41 from the PRIMARY STATE 76 to another state. The first event is the failure of the particular controller 41. If there is a failure, the controller 41 shifts from the PRIMARY STATE 76 to the RELEASED STATE 78. In the process of doing so, it will pass through the PRIMARY-TO-RELEASE STATE 80.

There are two types of failure which are possible in a controller 41. The first type of failure is a controlled failure. Further, there are two types of controlled failures.

The first type of controlled failure is a directed control failure. This is not an actual failure but instead a command input from an outside source instructing a particular controller to release its control. This command may be received in controller 41 from one of the following sources: An operator, through computer 10; a console 17 through a port 16 (e.g., RS-232) on the controller; or by software initiated during predictive maintenance. Typically, such a command is issued where diagnostic testing of a controller is to be conducted. In a directed controlled (release) failure, the controller finishes up any commands it is currently involved with and refuses to accept any further commands. The controller effects the release by sending out messages to the partner controller that it will be releasing control.

The second type of controlled failure is referred to as a partial failure. In this case, the controller recognizes that it has a problem and can no longer function properly to provide services to the system. For example, the memory or interface port associated with that controller may have malfunctioned. Therefore, even if the controller is properly functioning, it cannot adequately provide services to the system. It aborts any current commands, refuses to accept any new commands, and sends a message to the partner controller that it is releasing control. In both controlled failures, the malfunctioning controller releases controls of the set of tape arrays over which it has control. The control of these tape arrays is then performed by the partner controller.

The second type of failure is a complete failure. In a complete failure, the controller becomes inoperable and cannot send messages or process its currently pending commands by aborting them. In other words, the controller has lost its ability to serve the system. It is up to the partner controller to recognize the problem. The partner controller then takes control of the tape arrays controlled by the malfunctioning controller. The routing through the malfunctioning controller is switched over to the partner controller.

In the above failures, the switching of the controls from one controller to the other may take place without interruption to the operation of the computer. The controllers 41 handle the rerouting independently by communicating the failure among themselves. The transition states of FIG. 7 show which of several possible transition paths is used.

Assuming there was a failure in controller 41a, the controller 41a attempts to move from the PRIMARY STATE 76 through a transition PRIMARY-TO-RELEASE STATE 80 to RELEASED STATE 78. At the same time, properly functioning controller 41b moves from the PRIMARY STATE 76 to ALL STATE 82. The basis for the change in state of each of the controllers 41a and 41b is the failure of controller 41a. When a controller fails, it is important to switch control of the tape arrays away from the failed controller. This permits computer 10 to continue to access the tape arrays which were formerly controlled by the controller which has failed. In the current example of FIG. 4, tape arrays 42a–42c are switched so that they are controlled by the second controller 41b. Therefore, controller 41b is in the ALL STATE 82 indicating that it has control of all of the tape arrays 42. Controller 41a now controls none of the tape arrays and is in the RELEASED STATE 78.

If the controller 41a is in the RELEASED STATE 78 and controller 41b is in the ALL STATE 82, there are a number of options for transferring control of the tape arrays 42a–42e once controller 41a has been repaired. First, controller 41a and controller 41b could each be shifted back to the PRIMARY STATE 76. This is accomplished for tape arrays 42a–42c by controller 41a moving from the RELEASED STATE 78 directly to the PRIMARY STATE 76 along the p line. The p stands for "primary" which means that controller 41a takes control of its primary tape arrays. At the same time controller 41b moves from the ALL STATE 82 through a transition SECONDARY-TO-PRIMARY STATE 84, and then to the PRIMARY STATE 76.

A second alternative is for controller 41a to move from the RELEASED STATE 78 to the SECONDARY STATE 86. Once in the SECONDARY STATE 86, the controller 41a is in control of its secondary tape arrays 42d–42f. The controller 41b concurrently moves from the ALL STATE 82 through the PRIMARY-TO-SECONDARY STATE 88 and on to the SECONDARY STATE 86. When both controllers are in SECONDARY STATE 86, they are in control of their secondary sets of tape arrays. Controller 41a controls tape arrays 42d–42f and controller 41b controls tape arrays 42a–42c.

From SECONDARY STATE 86, a failing controller 41 may move through the SECONDARY-TO-RELEASE STATE 90 to the RELEASED STATE 78. If this occurs, the properly functioning partner controller 41 moves from the SECONDARY STATE 86 to the ALL STATE 82 so that the computer 10 could continue with access to any one of the tape arrays 42. As in the previous example, if controller 41a were to fail, it moves from the SECONDARY STATE 86 through the SECONDARY-TO-RELEASE STATE 90 and into the RELEASED STATE 78. At the same time, properly functioning controller 41b moves from the SECONDARY STATE 86 along the a/p line into the ALL STATE 82. The a/p stands for "all/primaries", which means that controller 41b controls all of the tape arrays.

If for all tape arrays 42, controller 41a is in the RELEASED STATE 78 and controller 41b is in the ALL STATE 82, it is possible for controller 41a to take control of all the tape arrays 42. This is desirable if the controller 41a were repaired and controller 41b failed. Controller 41a moves from the RELEASED STATE 78 along the b line to the ALL STATE 82. At the same time, controller 41b moves from the ALL STATE 82 through the ALL-TO-RELEASE STATE 92 and into the RELEASED STATE 78. At this point, controller 41a controls all of the tape arrays while controller 41b is released.

Figure 8A:
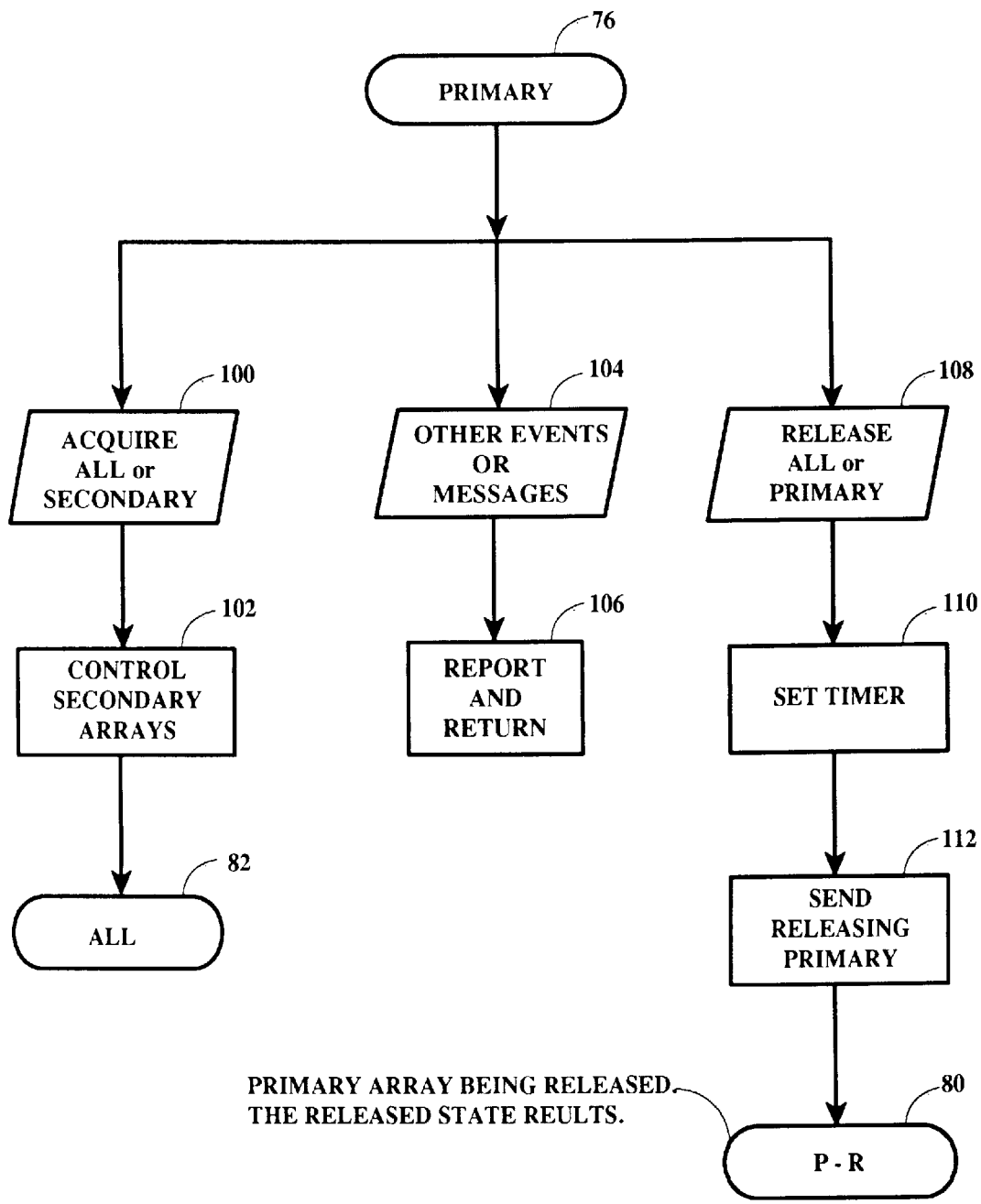
FIGS. 8A–8I show the events which take place during the transition between each of the states shown in FIG. 7.

Various failures may precipitate the movement of controllers 41 between states and between states a number of events may take place. Each of these events is described in FIGS. 8A–8I. In FIG. 8A, controller 41a is in the PRIMARY STATE 76. There are three different events which can take place while controller 41 is in the PRIMARY STATE 76. The first event is for an acquire message (100) to be received from the partner controller. At this point, the controller receiving such a message will take the secondary path, represented by block (102), and end up in the ALL STATE 82. The second path which may be taken is precipitated by the receipt of a message (104) from the other controller. This may be some sort of communication which results in the controller remaining in the PRIMARY STATE 76. It will report and return messages (106) to the other controller. The final path which may be taken results in the controller ending up in the PRIMARY-TO-RELEASE STATE 80. This path is precipitated upon receipt of a message (108) to release both sets of tape arrays or the primary tape arrays. A timer is then set in block (110) and upon time out a message (112) is sent to the other controller to assume control of the primary set of tape arrays. Once in the PRIMARY-TO-RELEASE STATE 80, controller 41 will eventually end up in the RELEASE STATE 78.

Figure 8B:
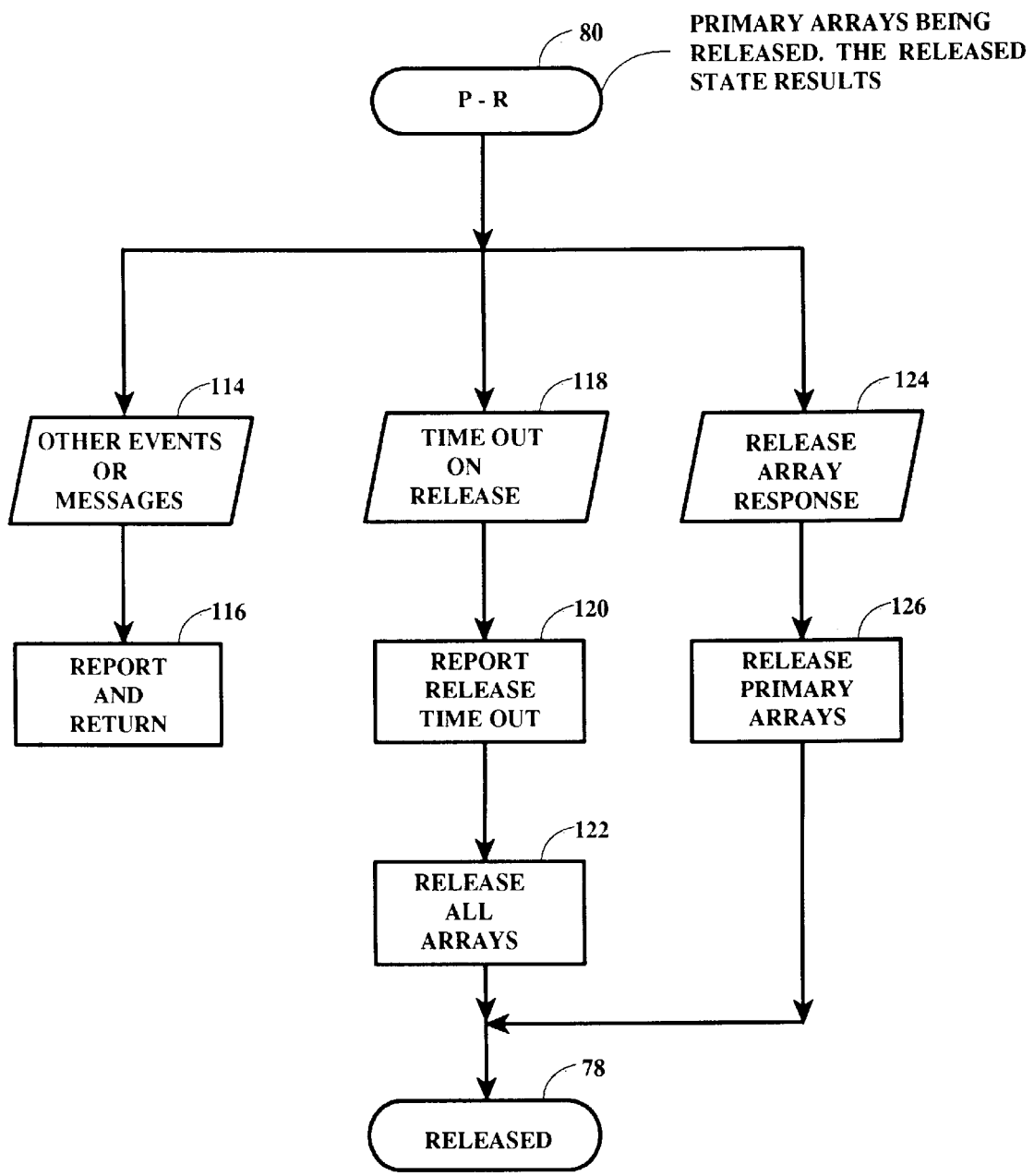

FIG. 8B illustrates various paths from the PRIMARY-TO-RELEASE STATE 80 to the RELEASE STATE 78. Three possible events may take place. First, a message (114) may be received from the other controller providing communication information. In this case, controller 41 reports back messages (116) and remains in the PRIMARY-TO-RELEASE STATE 80. The second event which may occur is for the timer, set during transition from PRIMARY STATE 76 to the PRIMARY-TO-RELEASE STATE 80 to time out (118). If this happens, controller 41 realizes that message (112), of FIG. 8A, did not get properly sent and that there has been a complete failure. It releases control of both its primaries and secondary tape arrays (122). It then ends up in RELEASE STATE 78. The third event which may occur while in the PRIMARY-TO-RELEASE STATE 80 is for a response to be received (124) from message (112), of FIG. 8A, sent out while the controller moved from the PRIMARY STATE 76 to the PRIMARY-TO-RELEASE STATE 80. This response indicates that the message was properly received. Controller 41 then releases its primary tape arrays (126) and ends up in RELEASE STATE 78.

Figure 8C:
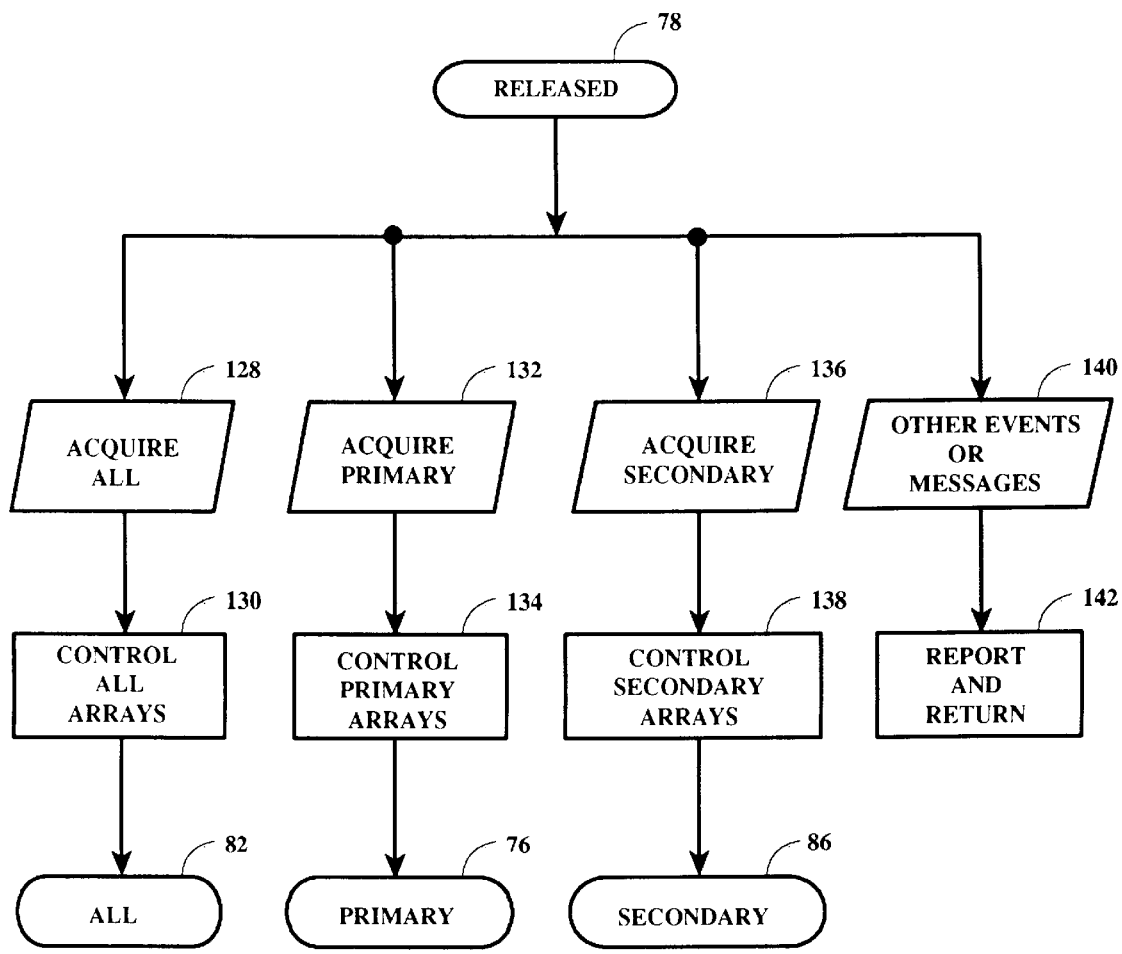

FIG. 8C covers the state transition between RELEASE STATE 78 and one of either the ALL STATE 82, the PRIMARY STATE 76, or the SECONDARY STATE 86. When in the RELEASE STATE 78, controller 41 can only receive messages. First, it may receive a message (128) instructing it to acquire both its primary and secondary sets of tape arrays. It performs this function (130) and ends up in the ALL STATE 82. A second possibility is for it to receive a message (132) instructing it to control its primary set of tape arrays. It performs this function and ends up in the PRIMARY STATE 76. A third alternative is the receipt of a message (136) instructing the controller 41 to acquire its secondary tape arrays. Upon performance of this instruction (138) it ends up in the SECONDARY STATE 86. Finally, while in RELEASE STATE 78 controller 41 may receive communication messages (140) from its partner controller. It reports back (142) to the other controller and remains in the RELEASE STATE 78.

Figure 8D:
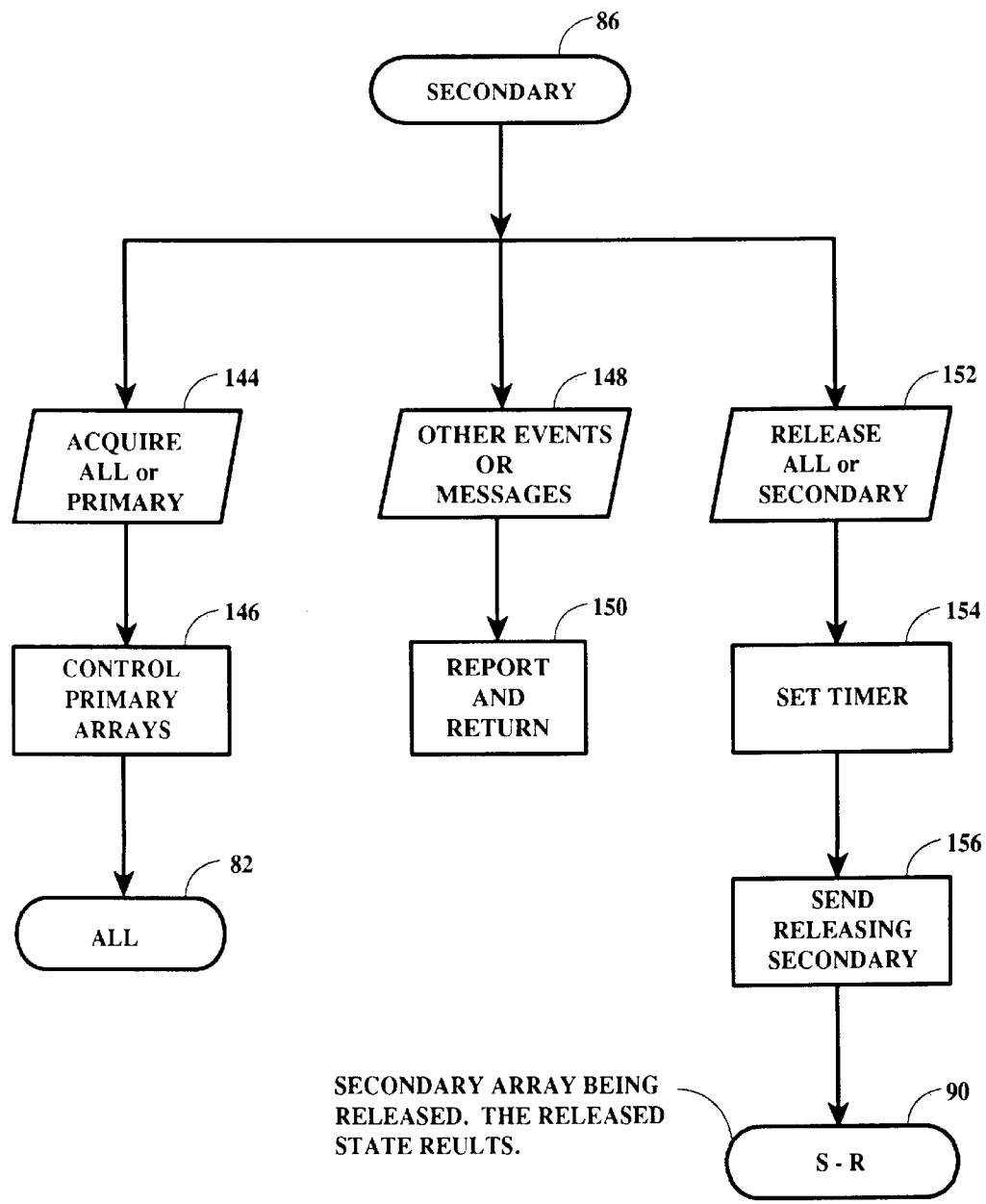

FIG. 8D illustrates the movement of controller 41 from the SECONDARY STATE 86 to the ALL STATE 82 or to the SECONDARY-TO-RELEASE STATE 90. While in the SECONDARY STATE 86, any one of three messages may be received by controller 41. A first possibility is for an acquire all tape arrays or a primary message (144) to be received. At this point, controller 41 takes control of its primary tape arrays (146) and ends up in the ALL STATE 82. A second possibility is for communication messages (148) to be received from the partner controller. This results in controller 41 reporting back (150) and remaining in its present SECONDARY STATE 86. Finally, a release all or secondary message (152) may be received. Controller 41 sets a timer (154) upon receipt of this message. It then sends out a message (156) indicating it is now in the SECONDARY-TO-RELEASE STATE 90.

Figure 8E:
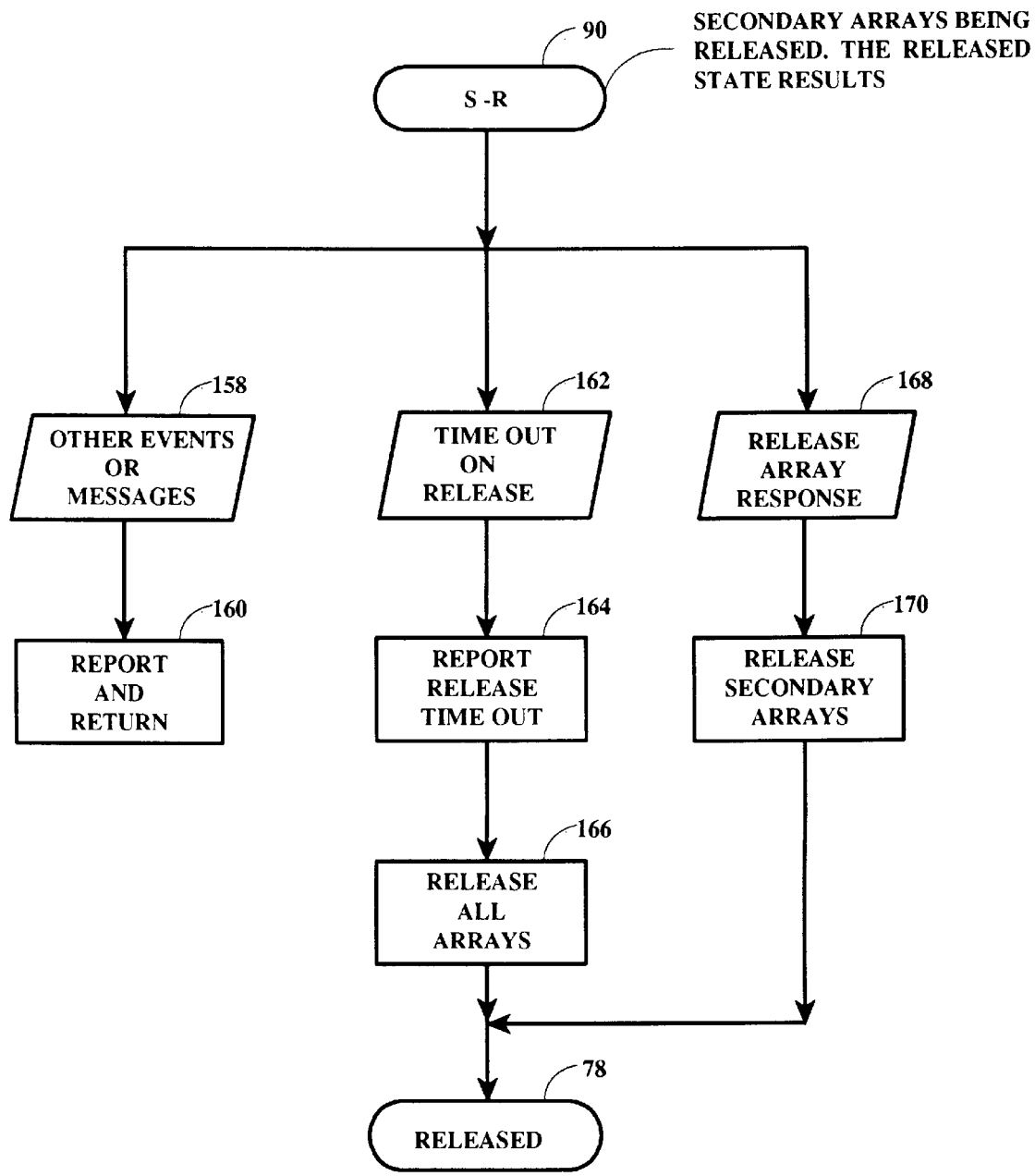

FIG. 8E shows the transition of controller 41 from the SECONDARY-TO-RELEASE STATE 90 to the RELEASE STATE 78. Three different messages may be received during SECONDARY-TO-RELEASE STATE 90. First, messages (158) from the partner controller may be received. Controller 41 then reports back (160) to its partner and remains in the SECONDARY-TO-RELEASE STATE 90. A second possibility is for the timer, set between the SECONDARY STATE 86 and the present state, to time out (162). This indicates that message (156) of FIG. 8D was not properly sent out and received by the partner controller and that there has been a complete failure to controller 41. Controller 41 then reports out (164) that it will release all of the sets of tape arrays (166). This results in it moving to the RELEASE STATE 78. Finally, controller 41 may receive a response (168) to its message (156), of FIG. 8D, sent after setting the timer between the SECONDARY STATE 86 and the SECONDARY-TO-RELEASE STATE 90. Upon receiving this response, it releases its secondary tape arrays and ends up in the RELEASE STATE 78.

Figure 8F:
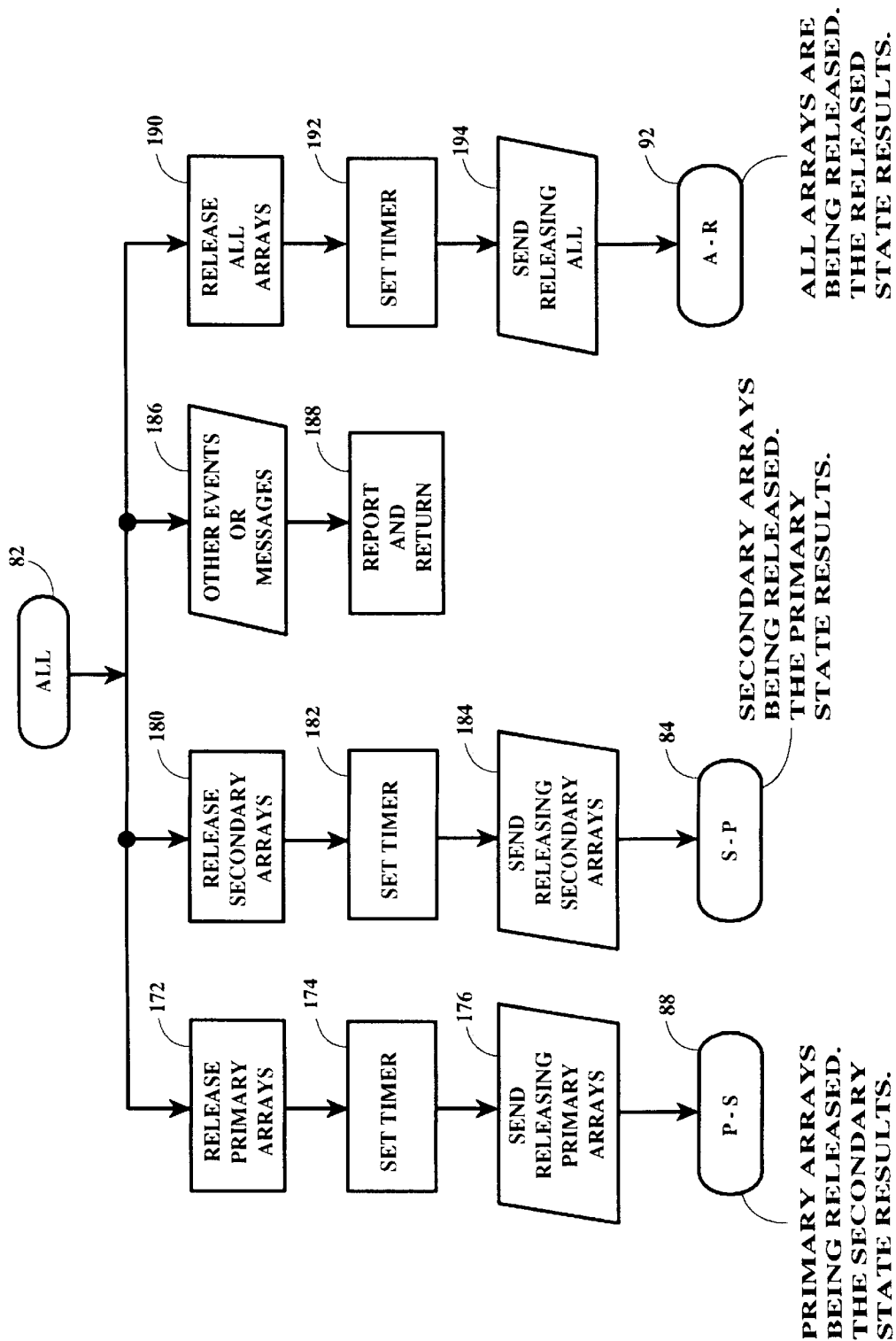

FIG. 8F illustrates the various paths from the ALL STATE 82 to any one of the PRIMARY-TO-SECONDARY STATE 88, the SECONDARY-TO-PRIMARY STATE 84, or the ALL-TO-RELEASE STATE 92. A first possible message which may be received during the ALL STATE 82 is a release primary message (172). This will cause controller 41 to set a timer (174), send a message (176) indicating it is releasing its primaries, and will wait in the PRIMARY-TO-SECONDARY STATE 88. A second message which may be received is a release its secondary set of tape arrays message (180). Upon receiving the release secondary message (180), the controller 41 sets a timer (182) and sends a message (184) indicating it has moved into the SECONDARY-TO-PRIMARY STATE 84. A third possibility is for the controller 41 to receive a communication messages (186) from its partner controller. It will report back (188) and remain in the ALL STATE 82. Finally, controller 41 may receive an instruction (190) telling it to release the primary and the secondary sets of tape arrays. At this point it sets the timer (192) and sends out a message (194) that it has released the primary and the secondary tape arrays. It will then remain in the ALL-TO-RELEASE STATE 92 until it receives further instructions from the other controller.

Figure 8G:
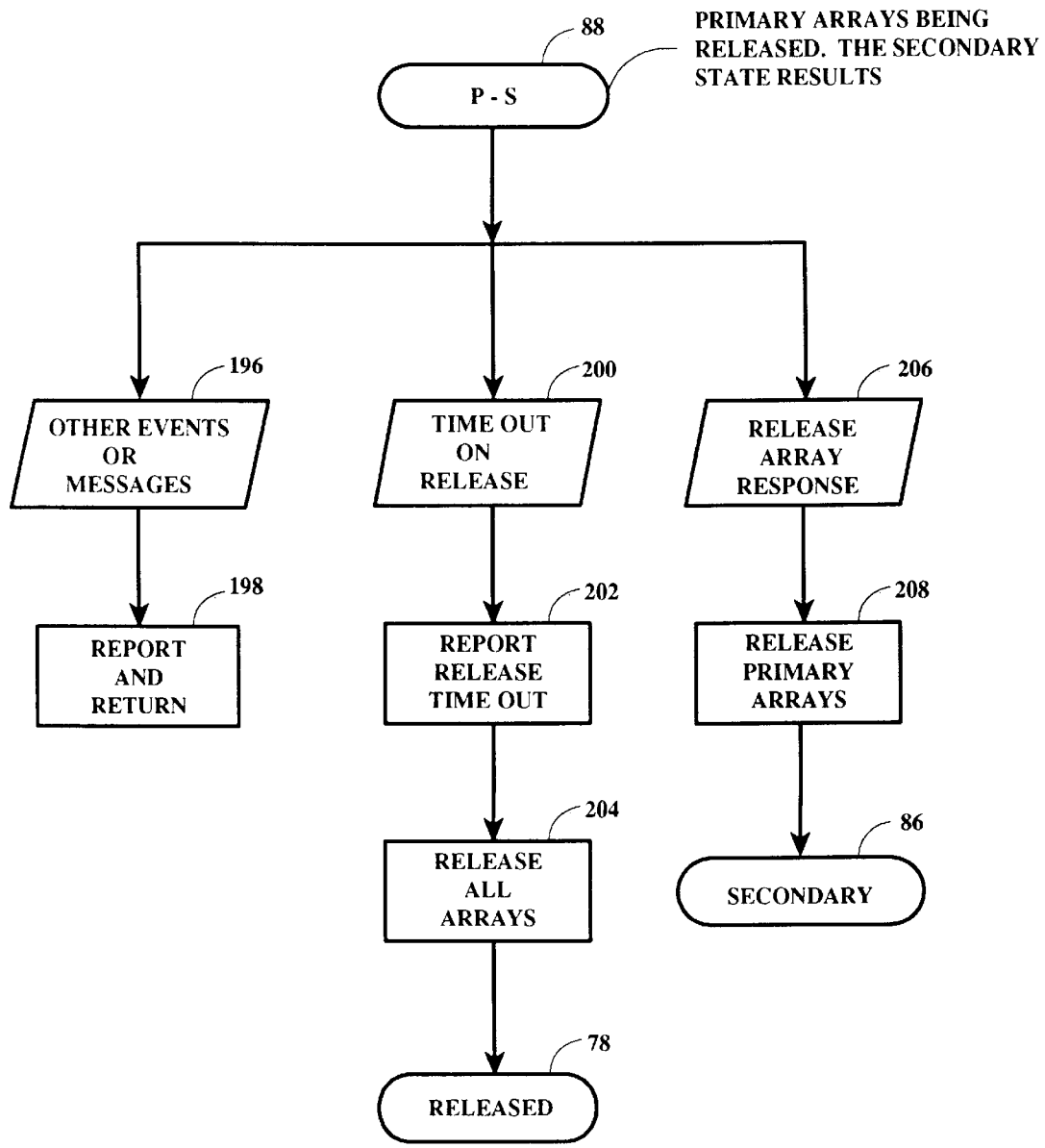

FIG. 8G shows the various paths by which a controller 41 moves from the PRIMARY-TO-SECONDARY STATE 88 to one of either the RELEASE STATE 78 or the SECONDARY STATE 86. The first possibility is that the controller 41 receives messages (196) from the other controller. It then reports back (198) and remains in PRIMARY-TO-SECONDARY STATE 88. A second possibility is that the timer (174), set between the ALL STATE 82 and the PRIMARY-TO-SECONDARY STATE 88 times out (200). At this point, the controller 41 realizes that the message (176), of FIG. 8F, was not properly sent. A complete failure has occurred. The controller reports (202) that it has released all sets of tape arrays, and releases all sets (204). The controller then enters RELEASE STATE 78. Finally, a path response message (206) is received acknowledging the receipt of the message (176), of FIG. 8F, sent between the ALL STATE 82 and the PRIMARY-TO-SECONDARY STATE 88. Controller 41 releases its primary tape arrays (208) and enters SECONDARY STATE 86.

Figure 8H:
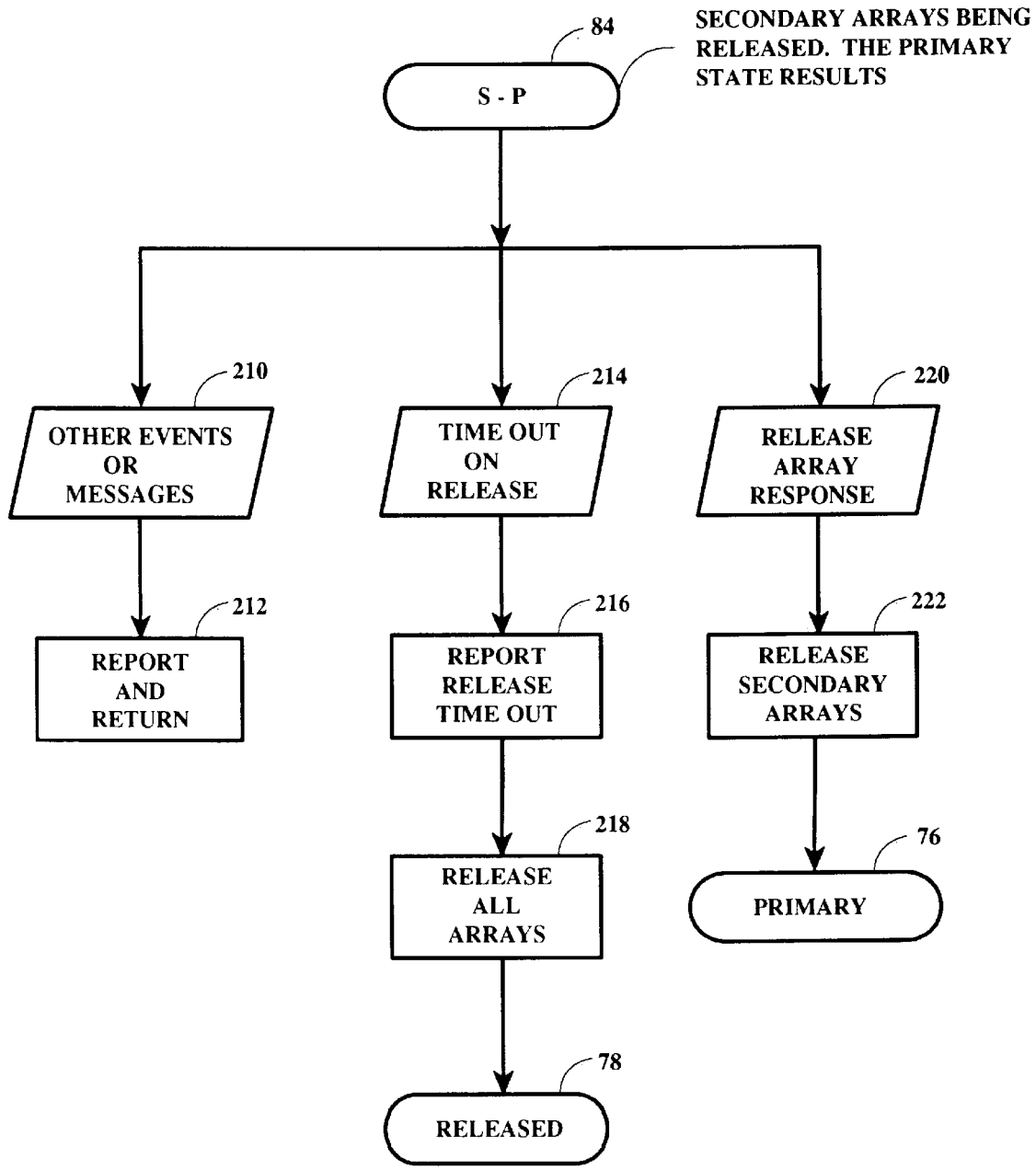

FIG. 8H shows the possible paths taken when controller 41 moves between the SECONDARY-TO-PRIMARY STATE 84 and one of either the RELEASE STATE 78 or the PRIMARY STATE 76. A first possibility is that the controller 41 receives a message (210) from the other controller. It then reports back (212) and remains in the SECONDARY-TO-PRIMARY STATE 84. A second possibility is that the timer (182), set between the ALL STATE 82 and the SECONDARY-TO-PRIMARY-STATE 84 times out (214). If this occurs, the controller 41 realizes that the message (184), of FIG. 8F, was not properly sent. A complete failure has occurred. The controller then sends the message (216) indicating that it has released its tape arrays and then it releases the primary and secondary tape arrays (218) which it controls. The controller then moves into the RELEASE STATE 78. Finally, a third possibility is that the controller 41 receives a response (220) to the message (184), of FIG. 8F, sent between the ALL STATE 82 and the SECONDARY-TO-PRIMARY-STATE 84. It will then release (222) its secondary tape arrays and enter the PRIMARY STATE 76.

Figure 8I:
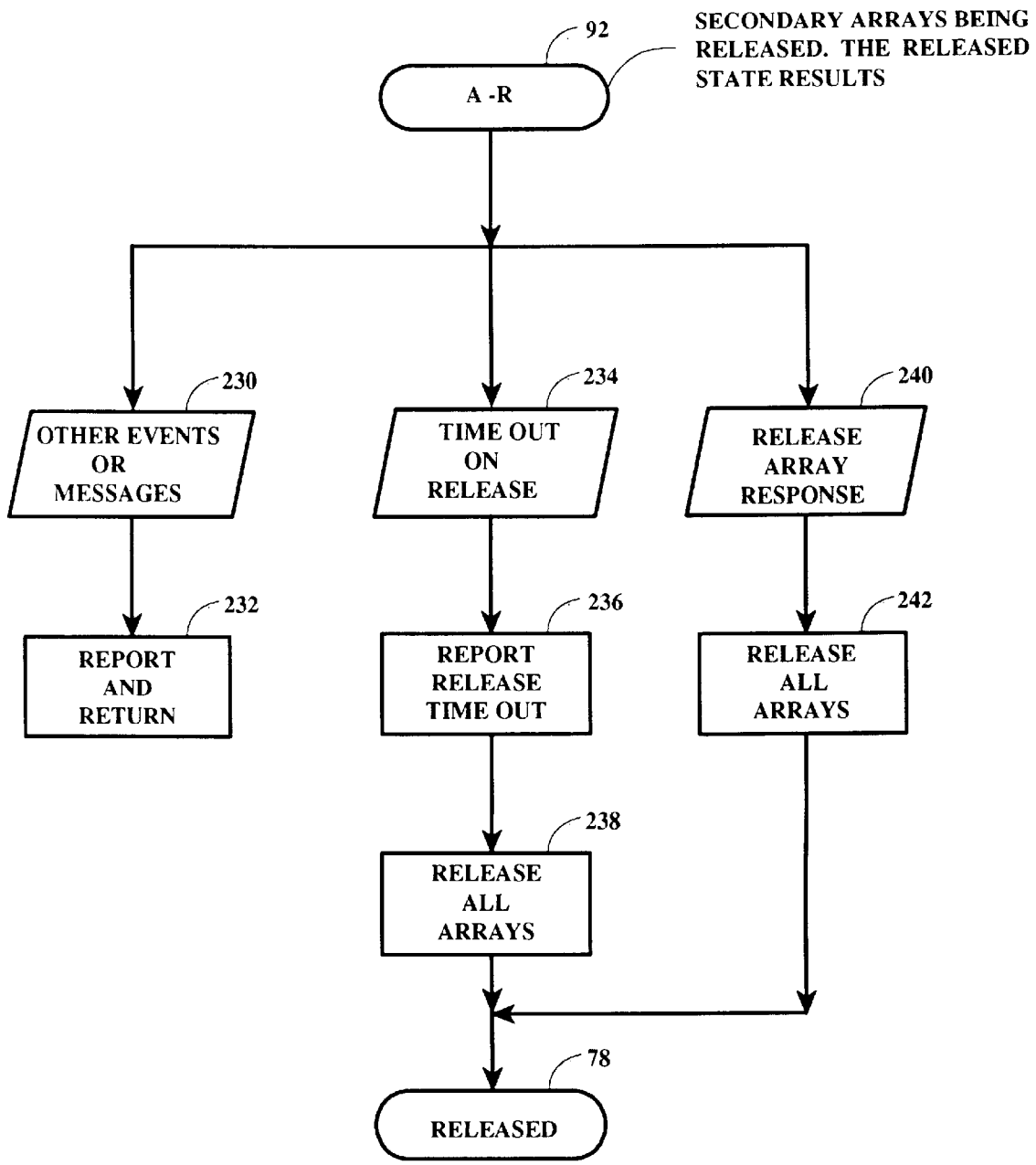

FIG. 8I shows the possible paths illustrating the transition of the controller between the ALL-TO-RELEASE STATE 92 and the RELEASE STATE 78. Three possible events may take place. First, a message (230) may be received from the other controller providing communication information. In this case, the controller 41 reports back messages (232) and remains in the ALL-TO-RELEASE STATE 92. The second event which may occur is for the time (192), set during the transition from the ALL STATE 82 to the ALL-TO-RELEASE STATE 92, to time out (234). If this happens, the controller 41 realizes that the message (194), of FIG. 8F, sent during the ALL STATE 82 was not properly sent and that there has been a complete failure. It releases control of both its primaries and secondary tape arrays (238). The controller then ends up in the RELEASE STATE 78. The third event which may occur while in the ALL-TO-RELEASE STATE 92 is for a response to be received (240) from the message (194), of FIG. 8F, sent out while the controller moved from the ALL STATE 82 to the ALL-TO-RELEASE STATE 92. This response indicates that the message was properly received and the controller 41 then releases all of the sets of tape arrays (242) and ends up in the RELEASE STATE 78.

Rerouting Data Paths Between Components

In operation, a controller 41 will load various registers (not illustrated herein) which configure the communications with the disk array and the particular tape arrays over interfaces 44. The particular configuration can be changed at any time while the system is operating. Data flow is bi-directional over all the buses. By configuring, the data flowing between any given controller may be sent from or to any given disk or tape array. Failure of any particular system element does not result in any significant performance degradation, as data flow can be routed around the failed element by reconfiguring. In a preferred mode of operation, data may be transferred from or to a particular tape array in parallel with other data transfers occurring in parallel on other tape arrays. This mode of operation allows for a very high data transfer rate of data to the computer.

Generation of Redundancy Terms and Error Detection on Data

The embodiment shown in FIG. 4 shows tape drives 55 through 57 and p redundancy term tape drive 58. An embodiment of the present invention utilizes 4 tape drives: three for data and one for p (parity) redundancy term per tape array. It will be understood that the exact number of tape drives, and their exact utilization may vary without in any way changing the present invention. Each tape drive 55–58 is coupled by a bi-directional bus (Small Computer Standard Interface) to tape array control units 52, herein labeled TAC. The TAC units perform some error detecting functions as well as buffering and steering the data flow into and out of the tape drives.

Each TAC unit 52 is in turn coupled by a bi-directional bus (Small Computer Standard Interface) to the controllers 41. The controllers contain word assemblers, bi-directional buses and an ECC elements (not shown). The controller generates parity that spans the data that is transferred by the computer. Each controller can send the data and the associated ECC data to both disk drives. The data is then read from the disk drives and sent to a particular tape array.

During write operations, while the blocks of data are assembled onto the disk drives, the new redundant term is generated within the controller 41 using an Error Correction Code (ECC) and assembled onto the disk drives. After this assembly, the data is written to the data tape drives and the redundant term is written to the redundant tape drive sequentially.

During read operations, after the blocks of data are assembled onto the disk drives, the calculations necessary to detect and correct data errors which use the term received from the redundant tape drive, is performed within the controller 41. If an error is detected, the transfer of data to the computer is interrupted and the incorrect data is corrected, if possible. The data is then read from the disk drives and sent to the host computer.

The illustrated connections of the controllers 41 allows data to be sent to or from any disk drive and/or any tape array by configuring the related control registers. This flexibility allows data to be routed away from any failed disk drive or tape array.

Redundancy Generation and Error Checking Equations

The main functional components of the preferred embodiment and the physical connections to one another have now been described. The various preferred modes of operation will now be described. In order to understand these functional modes, some understanding of the error detection and correction method used by the present invention will be necessary.

Various error detection and correction codes are known and used in the computer industry. The present invention in this embodiment is implemented using a parity error detection and correction code. Nothing herein should be taken to limit the present invention to using only a parity code. If other codes were used, various modifications to the ECCs would be necessary, but these modifications would in no way change the essential features of this invention.

The equation which generates the p (parity ECC) redundant term in the present invention is:

$$p = d_{n-1} + d_{n-2} + \ldots d_1 + d_0$$

The p redundant term is essentially the simple parity of all the data bytes enabled in the given calculation. All operations denoted by "+" are exclusive-OR ("XOR") operations. Essentially, the final p term is the sum of all $p_i$ terms. The preferred embodiment, using its implementation of the p redundant term codes, is able to correct the data on a single failed tape within a tape array. The p redundant term codes span the data contained within a single tape array (TA).

An additional redundancy spans the entire set of tape arrays. This is referred to as the system S redundancy. The S redundancy terms are essentially the simple parity of bytes aligned from each tape array within the system.

The equation which generates the S (parity ECC) redundant terms in this invention is:

$$S = d_{TA(M-1)} + d_{TA(M-2)} + \ldots + d_{TA1} + d_{TA0}$$

The preferred embodiment, using its implementation of the S redundant term codes, is able to correct the data on a complete failed tape array from the system.

The equation which generates the p (parity ECC) redundant term which covers the S redundant terms within a tape array is:

$$p = S_{n-1} + S_{n-2} + \ldots + S_1 + S_0$$

The p redundant term if the simple parity of all the S redundant term bytes enabled in the given calculation.

As stated, the ECCs can correct the data on a failed tape or a failed tape array in this embodiment.

Operational Modes

Although FIG. 4 only shows four tape drives 55–58 within the tape array 42, three are used for data tapes and one used for the p (array) redundant terms, an embodiment may use a different number of tape drives per tape array. Although FIG. 4, also, only shows six tape arrays 42a–42f, five are used for data and one is used for the S (system) redundant terms, a preferred embodiment uses 16 tape arrays, 15 used for data and one used for the S redundant terms. Although nothing herein should be construed to limit this discussion to that specific embodiment, the processing operations will be described with relation to that environment.

It should be realized that the S redundant terms can be dispersed across the tape arrays. Therefore, for six tape arrays 42a–42f shown in FIG. 4, one sixth of each tape array is used for the S redundancy terms and for an embodiment of sixteen tape arrays, one sixteenth of each tape array is used for the S redundant terms.

The embodiment of the present invention operates primarily in one of two modes of operations. These are single tape array processing operations and multiple tape array processing operations. These two modes of operations will now be discussed with reference to the figures.

Single Array Processing Operations

In single array processing operations, the tape s within a tape array are associated to one another to form redundancy groups. These groups are composed of three tapes with the associated data and one tape with the associated p redundant terms. When a group is loaded on the tape drives 55–58 data tapes are loaded on three tape drives and the associated p redundant tape is loaded on the fourth tape drive. The data on the tapes are organized into blocks FIG. 5b, (k bytes in length). The data blocks on the data tapes and the p redundant blocks on the redundant tape form Array Codewords FIG. 5a. The TAC unit 52 routes the data blocks and redundant block to the tape drives 55–589 which contain the associated tapes.

The processing applications require the ability to access each tape array independently. Although each tape array is independent, the additional system codeword with system S redundancy for the multiple tape arrays is maintained across the entire set of tape arrays as shown in FIG. 6b. The arrays 42a–42f are considered to comprise a single large set.

Each of the tapes within a tape array will either receive of transmit the data for the tape array in unison. If only a single tape array is read, the controller and ECC cannot do the calculation for the multiple tape array set S redundancy information since they need the data from the other tape arrays to assemble the entire system codeword to recalculate the multiple tape array S redundancy information and compare it to the stored multiple tape array S redundancy information for the array set.

The data appearing at the TAC 52 of a tape array is treated as one large p Array Codeword. This result is shown in FIG. 5a. the Array Codeword comprises data from or for tape 55, data from or for tape 56, and so on, with the p redundant tape 58 receiving or transmitting the p redundant term. In a set redundant processing write operation, the data is transferred to the TAC 52 in unison for routing to the proper tape. The tape drives 55–58 within the tape array will receive a block of data or a redundancy term whose length is equal to the data block. As shown, the same block of data in all the tape drives within a tape array will receive parts of the array codewords. For example, in the illustration, block 1 of tape drive 55 will receive a byte of data designated $d_{n-1}$ for the array codeword, block 1 of tape drive 56 will receive a byte of data designated $d_{n-2}$ for the array codeword and so on.

In the actual implementation of this preferred embodiment, the array codeword blocks are "striped" across the various tapes within a tape array. This means that for different associated tapes the array codeword blocks may be distributed on different tape drives. In other words, tape drive 55 may receive the array p redundant term blocks for one set of tapes and data blocks for another set of tapes. Thus, the array redundancy term blocks for a set of tapes within an array may be on any one of the tape drives 55–58.

During a tape array read operation, in the event that there is a failure of a tape or tape drive, the failed tape array will, in certain instances, communicate to the controller that it has failed. The tape array may communicate to the controller that a tape drive has failed or cannot correct the error using its own correction. The controller will then use the array codeword blocks and ECC to regenerate or reconstruct the data blocks or the array redundancy term blocks for the failed tape.

The controller and the ECC can calculate the replacement data, using the remaining data and p redundancy information, necessary to rewrite all the information that was on a failed tape.

When the array data blocks and array p blocks are received, the controller and ECC use the received data to calculate the replacement data for the failed tape drive. After the calculation is complete, the data blocks, including the recovered data, are sent to the disk drives. The operations to replace a failed tape and the data thereon involve the tape array that included the failed tape, and controller and the ECC function.

Regeneration of data occurs within the controller using ECC and the available array data blocks and/or array p redundancy term blocks. When a failed tape is to be replaced, the controller and ECC regenerate all the data for the replacement tape. Read/write operations are required on all of the tapes with associated p term blocks until all the data has been replaced. The regeneration of the tape takes a substantial amount of time, the process occurs in the background of the system's operations so as to reduce the impact to normal operations. Table 3 below shows the actions taken for regeneration reads. In Table 3, y represents the failed tape or tape drive. In Table 3, the column labeled Failed Tape indicates the particular tape that has failed. The last column describes the task of the controller and ECC given the particular indicated failure.

TABLE 3

| | Regeneration Read Failed Tape |
|---|---|
| p | Controller and ECC calculates the p redundancy data for the p tape |
| y | Controller and ECC calculates replacement data for the y tape |

During the regeneration process, the regeneration data blocks or the p redundancy term blocks are written to the tape being generated.

During a read operation, it should also be noted that an additional error detection may be provided by the controller and ECC. As the data is read from the tape array and staged to the disk drives a p redundant term is generated and when the p redundant term is read from the tape array it is compared to the generated term.

Table 4 indicates what actions may be taken by the controller and ECC when the indicated tape has failed during a failed tape read operation. In this operation, the tape indicated in the Failed Tape column is known to have failed prior to the read operation. The last column indicates the action response to the given failure.

TABLE 4

| | Failed Tape |
|---|---|
| p | No action by the controller |
| y | The controller and ECC calculate the data for the y tape |

Multiple Tape Array Processing Mode: Read

The processing applications require the ability to access each tape array independently. Although each tape array is independent, the system codeword with system S redundancy for the set is maintained across the entire set of tape arrays. For a normal read operation, the use of the system S redundancy is not generally needed. If only a single tape array is read, the controller and ECC cannot do the calculation for the set S redundant information since they need the data from the other tape arrays to assemble the entire system codeword to recalculate the system S redundancy and compare it to the stored system S redundancy. Thus, the data transferred from a tape array is validated using the p redundancy term and is read without using the system S redundancy.

Where tape array 42a is the one selected, the data is simply staged to the disk drives 43 and passed through controller 41 to the external computer. If a tape fails, the read operation is the same as for a failed tape described above, the replacement data blocks and array p redundancy term blocks generated by the controller and ECC are sent to the disk drives.

Multiple Tape Array Processing Mode: Write

Figure 6:
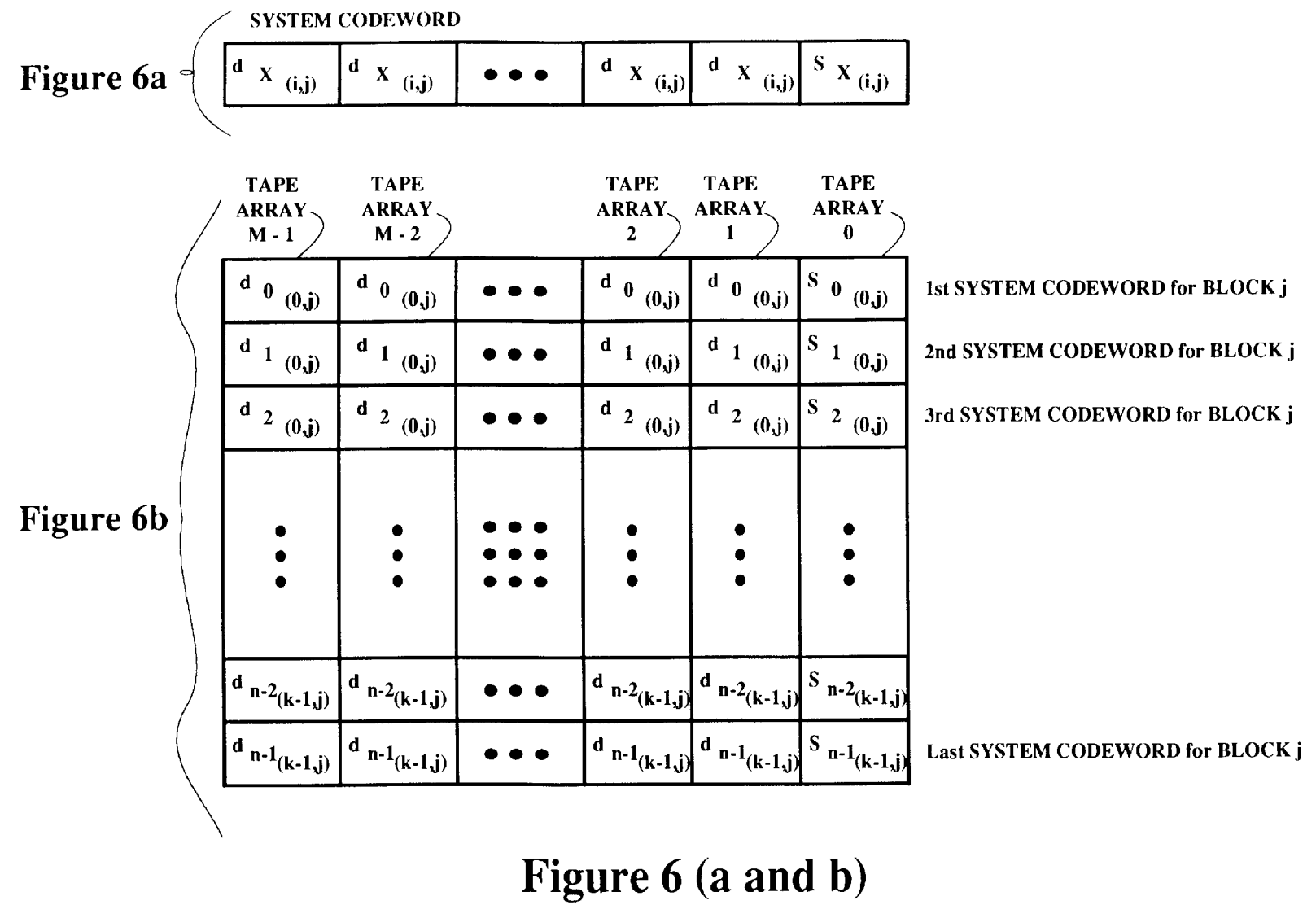

When any individual tape array is written to, the system S redundancy term blocks must also be changed to reflect the new data blocks (see FIG. 6). This is because the data blocks are being written over what was part of a system codeword extending over the entire set of multiple tape arrays and having the system S redundancy term blocks on one of the tape arrays of the set. The previously stored system S redundancy term blocks will no longer be valid when part of the system codeword is changed, so new S redundancy term blocks, S", must be calculated and written over the old S redundancy term blocks on its respective tape array. S" will then be the proper system redundancy terms for the modified system codewords.

One possible way to calculate S" is to read out the whole system codeword and store it. The new portion of the system codeword for tape array 42a can then be supplied for the ECC generation along with the rest of the system codeword, and the new S" can be calculated and stored on its tape array. However, if this method is used, it is not possible to simultaneously do another access to a different tape array (i.e., tape array 42b) having part of the system codeword, since that tape array 42b is needed for the write to the first tape array 42a.

According to a method of the present invention, simultaneous accesses are made possible by using only the old data blocks to be written over and the old system S redundancy term blocks to calculate the new system S" for the new data. This is done by calculating an intermediate system S' from the old data and the old system S redundancy term blocks, and then using the system S' with the new data to calculate the new system S" redundancy term blocks. This requires a read-modify-write operation on the data and system S redundancy term tape arrays. The equation for the new S (parity) is:

New system S redundancy (S")=(old system S–old data)+new data

System S'=old system S–old data

During the read portion of the read-modify-write, the data from the tape array to be written to and the system S (codeword) tape array are summed by the controller using the ECC. This summing operation produces the system S' redundancy terms. The system price (S') redundancy terms are retained and when the new data is received, the write portion of the cycle can begin. During this portion of the cycle, the new data and the system S' redundancy terms are summed by the ECC to generate the new system S" redundancy terms. When the summing operation is complete, the new data is sent to the tape array and the new system S" redundancy terms are sent to the system S (codeword) tape array. Note that only two tape arrays are involved with this write operation, therefore other operations with other tape arrays can take place simultaneously.

Parity Check for a Multiple Tape Array Processing Mode Write

With respect to Multiple Tape Array Processing functions during normal read operations, no action is required from the ECC. The actions taken by the controller and ECC function during a failed tape array in Multiple Tape Array Processing mode are listed in Table 5 below, where Z represents the failed tape array. The columns labeled Failed Tape Array indicates which tape array has failed. The last column indicates what action the controller and ECC may or may not take in response to the indicated failure.

TABLE 5

| | Failed Tape Array |
|---|---|
| S | Redundancy tape array is not read; no controller or ECC action |
| Z | The controller and ECC calculate the data for the Z tape Array, by a parallel read of all tape arrays |

In the read-before-write operation (part of the read-modify-write process), the controller and ECC generate the system S' redundant terms. Table 6 shows the actions taken by the controller and ECC when a failed tape array read precedes a write in this process. Again, Z represents the failed tape array. The columns headed by Failed Tape Array indicates which tape array has failed, and the last column denotes the response of the controller and ECC to the indicated failures.

TABLE 6

| | Failed Tape Array |
|---|---|
| S | Redundancy tape array is not read; no controller or ECC action |
| Z | The controller and ECC calculate and regenerate the old data by a parallel read of all tape arrays |

During a multiple tape array read operation, in the event that there is a failure of a tape array, the failed tape array may, in certain instances, communicate to the controller that it has failed. The controller will then use the system S codeword blocks and ECC to regenerate or reconstruct the data for the failed tape array.

The controller and the ECC can calculate the replacement data necessary to rewrite all the information that was on a failed tape array.

When the data blocks and system S blocks are received, the controller and ECC use the received data to calculate the replacement data for the failed tape array. After the calculation is complete, the data blocks, including the recovered data, are sent to the tape arrays in unison. All operations to replace a failed tape array and the data thereon occur while the system operates in a parallel mode.

Regeneration occurs within the controller using ECC and the available data blocks and/or system S redundancy term blocks. When a failed tape array is to be replaced, the controller and ECC regenerate all the data for the replacement tape array. Read/write operations are required until all the data has been replaced. The regeneration of the tape array takes a significant amount of time, as the process occurs in the background of the system's operations so as to reduce the impact to normal operations. Table 7 below shows the actions taken for regeneration reads where Z represents the failed tape array. In Table 7, the column labeled Failed Tape Array indicates the particular tape array that has failed. The last column describes the task of the controller and ECC given the particular indicated failure.

TABLE 7

| | Failed Tape Array |
|---|---|
| S | The controller and ECC calculate the replacement S redundancy terms by a parallel read of all the data tape arrays |
| Z | The controller and ECC calculate the replacement data by a parallel read of the S tape array and the remaining data tape arrays |

When a failed data tape array is to be written, all good data tape arrays must be read so that a new system S redundancy can be generated. All of the data from the good data tape arrays and the write data is summed to generate the new system S redundancy.

During write operations, the controller and ECC continue to calculate system S redundancy. Table 8 shows the tasks during failed tape array writes. Here S represents the system S redundancy tape array, and Z represents the failed data tape array. The columns Failed Tape Array denotes the particular failed tape arrays, and the last column indicates the response to the failed tape array.

TABLE 8

| | Failed Tape Array |
|---|---|
| S | Redundancy tape array is not read; no controller or ECC action |
| Z | The controller and the ECC calculate the system S redundancy using the staged regenerated old date (Table 6) |

Summary of Redundancy

The interconnected arrangements herein described relative to the preferred embodiments of the present invention allow for the transmission of data from the tape arrays to the disk drives or vice versa. Data from or to any given tape array may be routed to either of the two disk drives 53 under controller directions. Additionally, data on either disk drive 53 may be routed to any tape array 42 through the interfaces 44. Any given tape array, if it fails, can be removed from the system at any time. The controllers use alternative pathways to route data or redundancy terms around the failed component.

The arrangements of tapes, tape drives and tape arrays create an extremely fault-tolerant system. In the present invention, the failure of either disk drive can be easily accommodated by using the working disk drive. The present invention thus uses the error detection and correction capabilities of the ECC in an operational environment where the system's full operational capabilities can be maintained by configuring the system to cope with any detected disk, tape, tape drive or tape array failure. The controller and ECC can correct and regenerate the data for the failed tape, tape drive or tape array, by configuring the registers of the failed component, effectively removing it from the system and regenerate or reconstruct the data for the failed component.

Tape Drive Configuration and Format

The present invention allows a set of physical tapes to be configured as one or more logical tapes. In accordance with the present invention, such a set of physical tapes is configurable as one or more redundancy groups and each redundancy group is configurable as one or more data groups.

A redundancy group, as previously used in known sets, is a group of physical devices all of which share the same redundant device set. A redundant device is a device that stores duplicated data or check data for purposes of recovering stored data if one of the physical devices of the group fails.

Where check data is involved, the designation of a particular physical device as a redundant device for an entire redundancy group requires that the redundant device be accessed for all write operations involving any of the other physical devices in the group. Therefore, all write operations for the group interfere with one another, even for small data accesses that involve less than all of the data storage devices.

It is known to avoid this contention problem on write operations by distributing the check data throughout the redundancy group, thus forming a logical redundant device comprising portions of several or all devices of the redundancy group.

In the actual implementation of this preferred embodiment, the system S redundant term blocks are "striped" across the various tape arrays. This means that for each different group of system codeword blocks, a different tape array may contain the system S redundant term blocks. In other words, tape array TA(M−1) may store the first group of system S redundant term blocks, tape array TA(M−2) for the second group of system S redundant term blocks and so on, until what was originally tape array TA(M−1) receives another group of system S redundancy term blocks. Thus, the system S redundancy term blocks "stripe" through the tape arrays.

Figure 9:
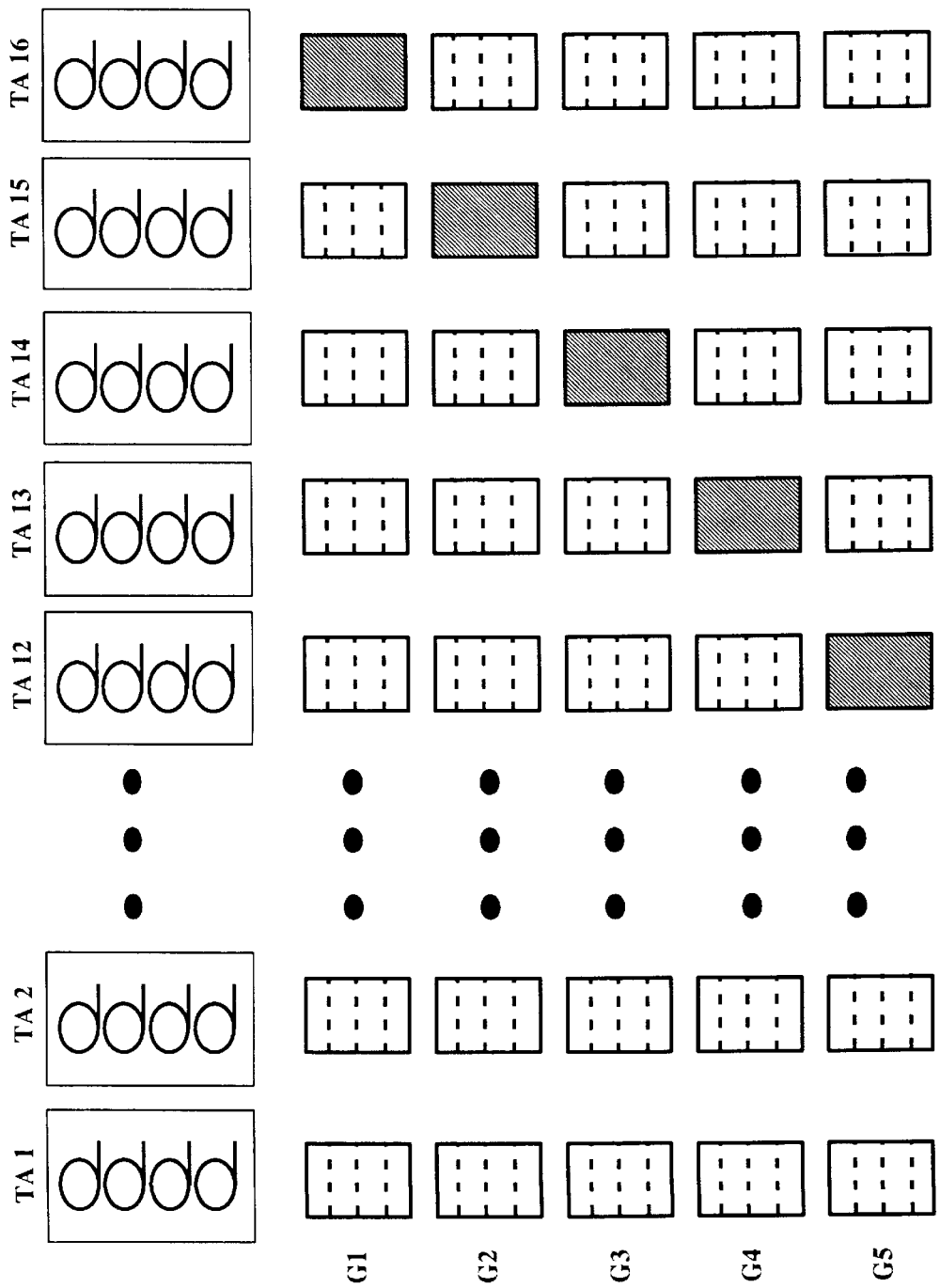
FIG. 9 is a schematic diagram of a set of tapes in which the check data is distributed among tapes of the set according to a known technique.

For example, FIG. 9 shows sets of information stored on 16 tape arrays. The columns represent the various tape arrays TA1–TA16 and the rows represent different groups of information blocks G1–G5 on the tape arrays. The groups of blocks containing check data are shown as hatched. The data groups G1 includes blocks of data on each of the tape arrays TA1–TA15 with the S redundancy (for G1) on tape array TA16. Data group G2 includes blocks of data on each of the tape arrays TA1–TA14 and TA16 with the S redundancy (for G2) on tape array TA15. Data group G3 includes blocks of data on each of the tape arrays TA1–TA13 and TA15, TA16 with the S redundancy (for G3) on tape array TA14. Data group G4 includes blocks of data on each of the tape arrays TA1–TA12 and TA14–TA16 with the S redundancy (for G4) on tape array TA13. Data group G5 includes blocks of data on each of the tape arrays TA1–TA11 and TA13–TA16 with the S redundancy (for G5) on tape array TA12.} { Blocks within group G1 of tape array TA16 contain check data blocks of the tape arrays TA1–TA15. Likewise, the remaining hatched blocks contain check data for their respective group block rows. Thus, if data is written to blocks within group G4 of tape array TA7, then updated check data is written into the corresponding blocks of G4 of tape array TA13. This is accomplished by reading the old data and the old check data, re-calculating the new check data using the old data and the new data, and writing the new check data blocks to the tape array TA13. This operation is referred to as a read-modify-write. Similarly, if data is written to a block of group GI of tape array TA14, then check data is written into the corresponding block of group tape array TA16. Since there is no overlap in this selection of four tape arrays for writes, both read-modify-write operations can be performed concurrently.

A distribution of check data in a redundancy group in the manner shown in FIG. 9 is known as a striped check data configuration. The term "striped redundancy group" is used here to refer generally to a redundancy group in which check data is arranged in a striped configuration as shown in FIG. 9, and the term "redundancy group stripe depth" will be used here to refer to the number of blocks of each check data group in such a striped redundancy group.

It is known to provide the whole set as a single redundancy group. It has been found that a redundancy group can be divided into various "sections", each defined as a portion of the depth of the redundancy group and each capable of having a configuration of check data different from that of other sections in the same redundancy group. Moreover, it is known that more than one redundancy group can be provided in a single device set, under the control of a single controller, and connected to a host computer.

Similarly, in previously known device sets, the single redundancy group included only one data group for application date—i.e., the device set operated as a single logical device. A redundancy group can be broken up into multiple data groups, each of which can operate as a separate logical storage device or as part of a larger logical storage device. A data group can include all available storage on a physical device (i.e., all of the storage on a device available for storing application data), or it can include all available storage on a plurality of physical devices in the redundancy group. Alternatively, a data group can include several physical devices, but instead of including all available storage of each device a data group might only include a portion of the available storage memory of each device. It is possible to allow data groups from different redundancy groups to form a single logical device. This is accomplished by superimposing an additional logical layer on the redundancy and data groups.

In previously known sets in which data is interleaved across the devices of the set, the data organization is of a very simple form. Such sets generally do not permit different logical organizations of data in the same logical unit nor do they permit mapping of the logical organization of data in a logical unit. The organization of data within a data group can be configured in a variety of ways. It is, also, known that the data stripe depth of a data group can be made independent of redundancy group stripe depth, and can be varied from one data group to another within the logical units to provide optimal performance characteristics for applications having different storage access needs.

To understand how the data is spread among the various physical tapes of an active set of a tape arrays, it is necessary to understand the geometry of the data. FIG. 10 shows two data groups D1 and D2 within a single redundancy group. Each of the tape arrays TA1–TA16 contain four tape drives. The data resides on the tapes that are loaded into these tape drives and can be logically organized as shown in FIG. 10.

Data group D1 represents one of the simplest types of data organizations. In this configuration the tape arrays TA1 and TA2 service data in a modularity of three contiguous blocks per tape array. This allows for three contiguous blocks to be transferred simultaneously by a minimum of one tape array and a maximum of two tape arrays, or for six contiguous blocks to be transferred simultaneously by the two tape arrays.

Data group D2 represents another type of data organization. In this configuration, the tape arrays TA12 through TA15 service data in a modularity of every fourth block per tape array. This allows for four to twelve contiguous blocks to be transferred simultaneously by the four tape arrays.

FIG. 10 comprises a single redundancy group in which two types of data groups are shown. Two types of data redundancy are shown in FIG. 10, the "p" check data and "S" check data are used to provide data redundancy. The p and S check data are the results of a parity coding algorithms applied to the stored within the tape arrays and the redundancy group. The particular method or type of redundancy used is implementation specific. As shown, the p redundancy data for each tape array is contained within that tape array and the S redundancy data is contained in a separate tape array which also has p check data covering the S redundancy. The S redundancy for different redundancy groups will be distributed across all of the tape arrays associated with the groups, thus forming two logical checks on the data within the redundancy group. For example, the p check data for the first three data blocks of S redundancy blocks of each tape array is contained on a separate tape within each tape array. Each time data is written to any one block, a read-modify-write operation is performed on the p and S check data contained in the corresponding blocks of the tape arrays to update the redundancy data.

Two data groups D1 and D2 are shown in FIG. 10. Data group D1 has a two data tape arrays with a maximum of six-tape drive bandwidths, data group D2 has four data tape arrays with a maximum of twelve tape drive bandwidths.

This, it is shown that a redundancy group can comprise data groups of different bandwidths. In addition, each of the data groups may alone, or in combination with any other data group or groups, comprise a separate logical tape storage unit. This can be accomplished by defining each data group or combination as an individual tape unit.

In FIG. 10, the data blocks are numbered within each data group as a sequence of logical data blocks. This sequence is defined when the data groups are configured, and can be arranged in a variety of ways. FIG. 10 presents a relatively simple arrangement in which the blocks within each of the data groups are numbered from left to right in stripes crossing the width of the respective data group. This arrangement permits for the given bandwidth of each data group a maximum parallel transfer rate of consecutively numbered blocks.

The term "data group stripe depth" is defined as, for a given data group, the number of logically contiguous data blocks stored on a tape within the boundaries of a single stripe of data in that data group. In the present invention, the depth of a data group stripe may be lesser than, greater than or equal to the depth of redundancy group stripe. As one example of this, FIG. 10 shows that the data groups D1 and D2 each has a data group stripe depth of one block, and are all included in a redundancy group having a redundancy group stripe depth of one block.

This redundancy group can handle up to six data read requests simultaneously, one from each of the data tape arrays TA1, TA2 and TA12–TA15 because the tapes can read or write independently of one another.

The redundancy group can handle up to six data read requests simultaneously, one from each of the data tape arrays TA1, TA2 and TA12–TA15 because the tapes can read or write independently of one another.

The redundancy groups are configured in FIG. 10 usually cannot handle simultaneous write operations to blocks in the data groups, because to perform a write operation in either of these data groups, it is necessary to write to the S redundancy tape array TA16 as well. However, the redundancy group can handle certain combinations of write requests simultaneously. For example, any of the data blocks 0 through 5 of data group D1 can be written simultaneously with any of the data blocks 0 through 11 of data group D2. Only one write operation can be performed on the S check data of tape array TA16 at any one time.

The distribution and striping of the S redundancy check data across the different tape arrays is important since write operations to two different levels of S redundancy terms on the same tape array cannot be done simultaneously. The need for the check tape arrays to read or write in more than one place at one time can be referred to as a "collision."

It is to be understood that the above described restriction concerning simultaneous writes to different data tape arrays sharing common S check tape arrays is peculiar to check data systems, and is not a limitation of the invention. For example, the restriction can be avoided by implementing a mirrored redundancy group, which does not have the property that different data tape arrays share the S redundancy data on the same tape array.

FIG. 9 shows a more particularly preferred embodiment of the redundancy groups configured by this invention. In FIG. 9, as in FIG. 10, the S redundancy data is spread among all of the tape arrays TA1–TA16 on a section of blocks basis, although they could also be on a per-tape basis or even on a per-block basis.

The distribution of the check data over the various tapes can be chosen in such a way as to minimize collisions. For a particular distribution, then to the extent that the controller 41 has a choice in the order of operations, the order operations can be chosen to minimize the collisions.

The distribution of redundancy groups and data groups over the active tape array system can be parameterized. For example, the redundancy group can be characterized by a redundancy group width (in tapes), representing the number of tapes spanned by a particular set of check data, a redundancy group depth (in any sub-unit—block) and a redundancy group stripe depth (also in any sub-unit—block). Data groups can be characterized by width (in tapes), depth (in any sub-unit—blocks), and data group stripe depth (also in any sub-unit—blocks). Because data groups do not have to start only at the beginning of a tape, they are also characterized by a "base", which is a parameter indication of the tape and the offset from the beginning of the tape at which the data group starts. A redundancy group may, like a data group, include less than all of an entire tape. In addition, as previously stated herein, a redundancy group may be divided into a plurality of sections. The sections of a redundancy group have equal widths and different bases and depths. For each section, the distribution of check data therein can be independently parameterized. In this embodiment, each redundancy group section has additional internal parameters, such as the depth of each redundancy group stripe within the redundancy group section and the tape position of the p and S check data for each such redundancy group stripe.

The redundancy group width reflects the trade-off between reliability and capacity. If the redundancy group width is high, then greater capacity is available, because the S redundancy tape array protects a larger number data tape arrays. At one extreme, if the redundancy group width=4, then a situation close to mirroring or shadowing, in which 50% of the tapes are used for check data exists. Low redundancy group widths represent greater reliability, but lower the capacity of the tape data storage system, while larger redundancy group widths represent greater capacity and lower, but still relatively high, reliability.

The data group stripe depth reflects a trade-off between bandwidth and request rate. This trade-off varies depending on the relationship of the average size of I/O requests to the system. The relationship of the average I/O request size to the system governs how often an I/O request will span more than one tape array within the data group; it thus also governs bandwidth and request rate. If high bandwidth is favored, the data group stripe depth is preferably chosen such that the ratio of average I/O request size to stripe depth is large. A large ratio results in I/O requests being more likely to span a plurality of tape arrays and data tapes, such that the requested data can be accessed at a higher bandwidth than if the data were located all on a single tape. If, on the other hand, a high request rate is favored, the data group stripe depth is preferably chosen such that the ratio of I/O request size to data group stripe depth is small. A small ratio results in a lesser likelihood that an I/O request will span more than one data tape, this increasing the likelihood that multiple I/O requests to the data group can be handled simultaneously.

The variance of the average size of I/O requests might also be taken into account in choosing the data group stripe depth. For example, for a given average I/O request size, the data group stripe depth needed to achieve a desired request rate might increase with an increase in the I/O request size variance.

In accordance with the present invention, the flexibility of the tape storage apparatus comprising a plurality of physical tapes can be further enhanced by grouping data groups from one or from different redundancy groups into a common logical tape unit, referred to as an application unit. Such application units can thus appear to the application software of an operating host as a single logical tape unit combining the different operating characteristics of the various data groups. Moreover, the use of such application units permits data groups and redundant groups to be configured as desired by an operator independent of any particular storage architecture expected by the host application software. This additional level of logical grouping, like the redundancy group and data group logical levels, is controlled by the controller 41.

The data address space of a logical data unit LUNO may comprise a single data group D1, as shown in FIG. 10. Data group D1 includes 42 logically data blocks 0–41 and correspond with logical block numbers LBNO–LBN41. Another logical unit LUN1 may include the data group D2, comprising respectively 84 data blocks numbered 0–83 corresponding to the logical blocks LBNO–83 of logical unit LUN1. For example the logical blocks of a logical unit can be mapped as desired to the data blocks of one or more data groups in a variety of ways.

The operator, initially at installation time and/or during run-time, formats and configures the application units he desires to use by first determining the capacity, performance and redundancy requirements for each unit. Once the capacity, performance and redundancy requirements have been defined, the logical structure of the units can be specified by defining the parameters for each of the logical layers (redundancy group layer, data group layer and application unit layer). These parameters are provided to the configuration function and processed by the controller 41. The configuration function manages this memory resident configuration information for the system. A copy of this information is kept in a non-volatile memory to prevent the information from being lost in the event of a power failure affecting the system. The controller 41 utilizes this information as input parameters when formatting the physical drives of the system as directed by the operator.

During each I/O request to the system, the mapping from tape unit address to the physical address spaces is made by the controller 41. Mapping is a matter of examining the configuration to translate: (1) from a tape unit logical address specified in the I/O request to a sequence of data group addresses; (2) from the sequence of data group addresses to a set of addresses on the logical tape array positions within the redundancy group; and then (3) from the set of addresses on logical the tape array positions to the actual physical tape addresses. This mapping process can be done by having the controller 41 step through the data structures of the configuration in response to each I/O request. Alternatively, during initialization of the system tape arrays the configuration function can generate subroutines for performing a fast mapping function unique to each data group. The particular manner in which the controller carries out the mapping operations is implementation specific.

It may occur that during operation of the system one of the tape arrays fails, such that the data on the missing or failed tape array must be reconstructed on another tape array. In this circumstance, the configuration of the system must be changed to account for the new tape array, as well as to account for the temporary changes within the system that must be implemented for the reconstruction period during which the data is regenerated from the missing or failed tape array and reconstructed on a replacement tape array. The configuration functions redefine the parameters in order to remap the system configuration.

It is thus seen that slower devices are grouped together in order to satisfy high bandwidth performance requirements of host computers. Access to different areas of data is provided at high rates. A simple redundancy method including straight parity and partitioning the system such that the replaceable components are grouped provide a high level of data access availability.

The slow speed storage devices are organized in a parallel fashion to increase the transfer rates performance to CPU interfaces. Improved performance results from interlacing the data in a predetermined manner to the tape drives of the storage arrays operating in parallel. The transfer rates of slower and therefore lower costs storage is assembled through parallel architecture to match the CPU bandwidth requirements. Such use of lower cost devices improves the reliability and price performance of data storage apparatus. The use of many tape drives built into a system using byte-serial magnetic disc drives, as staging functions, thus provide cost effective storage to serve the CPU. The system can be assembled to provide differing levels of performance using different technologies, the higher the transfer rate the more costly the system, although this technique optimizes the cost of the system.

Such storage system utilizes a local micro-processor and magnetic disc drives for storing or retrieving data for external CPUs. The system includes at least two data paths interfacing to a plurality of drives for the storage devices, and the magnetic disc drives. The data paths are coupled to the CPU interfaces and are controlled by the programmed micro-processor. The micro-processor provides path control for selecting storage drives and the magnetic disc drive for data transfers. Data is staged using the magnetic disc drives and then read from and written onto the bit-serial storage drives in parallel. This configuration may provide for a bandwidth to/from the storage devices that is approximately that of one-half of the bandwidth of the data paths. The CPU interface transfer rates define the number of internal data paths required for a given performance. The serial slow transfer drives can be organized into parallel type architecture to facilitate and accommodate the bandwidths required to service the transfer rates needed by the CPUs.

The data is distributed onto the slow speed storage devices of the storage arrays 42 in a manner to maximize the bandwidth and to increase the data storage reliability. This architecture provides reliability and performance while minimizing the cost. Thus, the slow speeds of the serial tape drives are organized to accommodate the transfer rates of the high performance internal magnetic disc drives, which are more closely aligned to the transfer rates required by the CPU. The CPU commands for Backups or Restores are usually for staging data from/to an external disc drive and for a more efficient data storage system the transfer rates of the backup image should match those of the external disc drive.

In order to optimize the resource utilizations, the transfer with the CPU should be performed by high performance parallel transfer devices such as magnetic disc drives. The CPUs will obtain bandwidths approximately equal to that of the internal magnetic disc drives. Instantaneous data transfers will approach the maximum of the data paths by using the internal disc drive track buffers.

In general, to those skilled in the art, many changes in construction and widely differing embodiments and applications of this invention will suggest themselves without departing from its spirit and scope. For instance, a greater number of controllers may be implemented in the system. Further, the structure of the functions connecting the controllers to the disk drives, tape drives and tape arrays may be altered so that different disk drives, tape drives or tape arrays are the primary responsibility of different controllers. Thus, the disclosures and descriptions herein are purely illustrative and not intended to be in any sense limiting.

While a preferred embodiment of the invention has been described using specific terms, such description is for illustrative purposes only, and it is to be understood that changes and variations may be made without departing from the spirit or scope of the following claims.

What is claimed is:

1. The method of transmitting and storing data from high speed data streams from a host computer comprising the steps of:

providing a plurality of serially accessed storage devices in predetermined storage arrays receiving said high speed data streams from the host computer;

providing a higher speed random accessed storage means receiving said data for staging and storing the data on said serially accessed storage devices;

coupling a redundancy of access control and sequencing means including a plurality of storage and access controllers to said higher speed random accessed storage means;

providing error correction means for said storage arrays coupled to said storage and access controllers for correcting errors resulting from failure of a storage array;

providing means for controlling and correcting errors in the data streams transmitted between the serially accessed storage devices and the higher speed random accessed storage means;

whereby a redundant, fault tolerant method of transmitting and storing data from high speed data streams is provided wherein slower speed serially accessed storage devices service higher speed random accessed storage means receiving high speed data streams from a host computer.

2. Apparatus for transmitting and storing data from high speed data streams from a host computer comprising:

a plurality of serially accessed storage devices in predetermined storage arrays coupled to said storage and access controllers receiving said high speed data streams from the host computer;

higher speed random accessed storage means receiving said data for staging and storing the data on said serially accessed storage devices;

a plurality of storage access controllers providing a redundancy of access and sequencing control to said high speed random accessed storage means; and means for controlling and correcting errors in the data streams transmitted between the serially accessed storage devices and the higher speed random accessed storage means;

whereby a redundant, fault tolerant apparatus transmits and accessibly stores data from high speed data streams wherein slower speed serially accessed storage devices service higher speed random accessed storage means receiving high speed data streams from a host computer.

3. The method of transmitting high speed data streams comprising the steps of:

providing a plurality of serially accessed storage devices in predetermined storage arrays transmitting said high speed data streams;

providing a higher speed random accessed storage means for staging said data from said serially accessed storage devices;

coupling a redundancy of access control and sequencing means including a plurality of storage and access controllers to said higher speed random accessed storage means;

providing error correction means for said storage arrays coupled to said storage and access controllers for correcting errors resulting from failure of a storage array; and providing means for controlling and correcting errors in the data streams transmitted between the serially accessed storage devices and the higher speed random accessed storage means;

whereby a redundant, fault tolerant method of transmitting and retrieving data from high speed data streams is provided wherein slower speed serially accessed storage devices service higher speed random accessed storage means receiving high speed data streams.

4. Apparatus for retrieving data and transmitting in high speed data streams comprising:

a plurality of serially accessed storage devices in predetermined storage arrays coupled to said storage and access controllers transmitting said high speed data streams;

higher speed random accessed storage means for staging and transmitting said data from said serially accessed storage devices;

a plurality of storage access controllers providing a redundancy of access and sequencing control to said high speed random accessed storage means and;

means for controlling and correcting errors in the data streams transmitted between the serially accessed storage devices and the higher speed random accessed storage means;

whereby a redundant, fault tolerant apparatus transmits high speed data streams wherein slower speed serially accessed storage devices service higher speed random accessed storage means receiving high speed data streams.

5. The method of transmitting and storing data from high speed data streams comprising the steps of:

providing a plurality of serially accessed storage devices in predetermined storage arrays receiving said high speed data streams;

providing a higher speed random accessed storage means receiving said data for staging and storing the data on said serially accessed storage devices;

coupling a redundancy of access control and sequencing means including a plurality of storage and access controllers to said higher speed random accessed storage means;

providing error correction means for said storage arrays coupled to said storage and access controllers for correcting errors resulting from failure of a storage array; and providing means for controlling and correcting errors in the data streams transmitted between the serially accessed storage devices and the higher speed random accessed storage means;

whereby a redundant, fault tolerant method of transmitting and storing data from high speed data streams is provided wherein slower speed serially accessed storage devices service higher speed random accessed storage means receiving high speed data streams.

6. Apparatus for transmitting and storing data from high speed data streams comprising:

a plurality of serially accessed storage devices in predetermined storage arrays coupled to said storage and access controllers receiving said high speed data streams;

higher speed random accessed storage means receiving said data for staging and storing the data on said serially accessed storage devices;

a plurality of storage access controllers providing a redundancy of access and sequencing control to said high speed random accessed storage means and;

means for controlling and correcting errors in the data streams transmitted between the serially accessed storage devices and the higher speed random accessed storage means;

whereby a redundant, fault tolerant apparatus transmits and accessibly stores data from high speed data streams wherein slower speed serially accessed storage devices service higher speed random accessed storage means receiving high speed data streams.

* * * * *